(12) United States Patent
Kikuchi et al.

(10) Patent No.: US 7,043,986 B2
(45) Date of Patent: May 16, 2006

(54) VIBRATORS AND VIBRATORY GYROSCOPES

(75) Inventors: Takayuki Kikuchi, Nagoya (JP); Yukihisa Osugi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/770,367

(22) Filed: Feb. 2, 2004

(65) Prior Publication Data

US 2004/0154395 A1    Aug. 12, 2004

(30) Foreign Application Priority Data

Feb. 5, 2003    (JP)    .......................... P2003-028600
Feb. 10, 2003   (JP)    .......................... P2003-032799

(51) Int. Cl.
*G01P 9/00*    (2006.01)
*G01C 19/00*   (2006.01)
*G01D 21/00*   (2006.01)
*G01M 7/00*    (2006.01)
*H01L 41/08*   (2006.01)

(52) U.S. Cl. ...................... 73/504.12; 73/651; 73/662; 73/310; 73/370

(58) Field of Classification Search ............. 73/504.12, 73/504.14, 504.16, 504.02, 662, 1.77, 504.03, 73/504.04, 514.34, 651; 310/311, 321, 330, 310/370

See application file for complete search history.

(56) References Cited

U.S. PATENT DOCUMENTS

| | | | | |
|---|---|---|---|---|
| 5,912,524 A | * | 6/1999 | Ohnishi et al. | ............. 310/321 |
| 6,724,271 B1 | * | 4/2004 | Sakata et al. | ............... 331/156 |
| 6,894,428 B1 | * | 5/2005 | Tanaya et al. | ............... 310/370 |
| 6,898,832 B1 | * | 5/2005 | Kawashima | ................ 29/25.35 |
| 2002/0113527 A1 | * | 8/2002 | Kawashima | ................ 310/370 |

FOREIGN PATENT DOCUMENTS

| | | |
|---|---|---|
| JP | 11-125528 | 5/1999 |
| JP | 2001-012952 | 1/2001 |
| JP | 2002-204141 | 7/2002 |
| JP | 2002-261575 | 9/2002 |
| JP | 2002-340559 | 11/2002 |

* cited by examiner

*Primary Examiner*—Hezron Williams
*Assistant Examiner*—Tamiko Bellamy
(74) *Attorney, Agent, or Firm*—Burr & Brown

(57) ABSTRACT

A vibrator for generating a signal for measuring a physical quantity using a vibrator is provided, including at least one bending vibration arm vibrating in bending mode along a specified plane and having a first end, an opposed second end, and first and second main faces that are substantially parallel with each other. A base portion is provided at the first provided at the first end of the bending vibration arm, a weight portion is provided at the second end of the bending vibration arm, and grooves are formed on the first and second main faces. The vibrator further includes driving means for exciting a driving vibration in the vibrator, and detecting means provided on one of the bending vibration arms for detecting an output signal based on detection vibrations induced in the vibrator responsive to the physical quantity to be measured.

23 Claims, 21 Drawing Sheets

VIBRATORS AND VIBRATORY GYROSCOPES

This application claims the benefits of Japanese Patent Applications P2003-32799 filed on Feb. 10, 2003, and P2003-28600 filed on Feb. 5, 2003, the entireties of which are incorporated by reference.

BACKGROUND OF THE INVENTION

1. Field of the Invention

The present invention relates to a vibrator preferably used for a vibratory gyroscope.

2. Related Art Statement

The applicant has studied various applications of a vibratory gyroscope, such as a turning angular rate sensor employed in a vehicle dynamic control system of an automobile body based on a vehicle turning rate feedback system. Such a system detects the direction of a steering wheel itself by a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting a wheel torque and a steering angle on the basis of this difference.

It is indispensable to detect the turning angular rate at a high precision in such control system. When the detection of turning angular rate at a high precision is tried, however, unnecessary dislocation may be easily induced in the bending vibration arm of a vibrator. The unnecessary dislocation may directly contribute to an error in a detection signal from the arm. That is, in a vibratory gyroscope, driving vibration is excited in the driving vibration arm of a vibrator and the vibrator is then turned. A detection electrode provided in a detection vibration arm detects detection vibration induced in the vibrator. The thus obtained alternating output signal is supplied into a detection circuit, and subjected to a process for cutting the effects of the driving vibration as possible to finally obtain an output signal corresponding to a turning angular rate. The output signal is normally output as a value of direct current. The unnecessary vibration and dislocation directly affect the measured value of turning angular rate, so that it is difficult to precisely cut the noise.

The applicant has disclosed to form an elongate hole in a driving vibration or detection vibration arm of a vibrator, as described in Japanese patent publication 11-125528A. The applicant has tried to provide a through hole in a longitudinal direction of an elongate arm so as to reduce the resonant frequency of the arm. It has further tried to provide driving and detection vibration electrodes on the inner wall surfaces of the through holes to reduce the above described unnecessary deformation and vibration.

Further in Japanese patent publications 2002-261575A and 2002-204141A, it is disclosed to provide a bending vibration arm having a cross section substantially of H-character by providing two opposing grooves on both faces of the bending vibration arm. Japanese patent publication 2002-340559A disclosed to form grooves in the tines and base portion of a fork-shaped vibrator.

SUMMARY OF THE INVENTION

When a through hole is provided in a bending vibration piece as described in Japanese patent publication 11-125528A, such through hole is not problematic as long as the bending vibration arm is an elongate rod having a cross section of a square. It has, however, recently been studied to mount a vibrator in a camera module of, for example, a mobile phone. It is thus necessary to miniaturize a vibrator for the mounting. When the vibrator is miniaturized, however, it is necessary to reduce the length of the bending vibration arm so that a sufficient sensitivity cannot be obtained. It is thus considered that a weight or wider portion is necessarily provided at the tip end of the bending vibration arm to increase the vibration energy of the bending vibration arm and to improve the sensitivity of the detection.

When a through hole is provided in and a weight portion is provided at the tip end of the bending vibration arm, it is proved that its crystal impedance may be increased and the detection sensitivity may be reduced.

It is also known to provide a groove in the bending vibration arm. When the groove is provided by etching, however, a substantial tapered or curved portion is inevitably formed on the inner wall surface of the groove. It is proved that the crystal impedance may be thus increased and the detection sensitivity may be reduced.

An object of the present invention is to improve the sensitivity of a vibrator having at least one bending vibration arm vibrating in bending mode along a specified plane, and a base portion provided at one end of the arm.

A first aspect of the present invention provides a vibrator comprising at least one bending vibration arm vibrating in bending mode along a specified plane and having one and the other ends and one and the other main faces substantially parallel with each other, a base portion provided at one end of the bending vibration arm, and a weight portion provided at the other end of the bending vibration arm. Grooves are formed on the one and the other main faces, respectively.

According to the first aspect of the present invention, the weight portion is provided at the tip end of the bending vibration arm and grooves are provided on both main faces of the arm, respectively. According to such construction, the crystal impedance of the bending vibration arm can be lowered and the detection sensitivity can be improved, compared with a vibrator having a through hole formed in the bending vibration arm.

The reasons may be speculated as follows. That is, the weight portion provided at the tip end of the bending vibration arm should be effective for improving the vibration energy. In this case, however, when an elongate through hole is provided in the bending vibration arm, the weight portion functions as a kind of fixing part to prevent the movement of the weight portion. The crystal impedance is thus increased. When the weight portion is provided at the tip end of the bending vibration arm and grooves are formed on both main faces of the bending vibration arm, the dislocation of the weight portion is increased to reduce the crystal impedance as a whole.

A second aspect of the present invention provides a vibrator comprising at least one bending vibration arm vibrating in bending mode along a specified plane and having one and the other ends and one and the other main faces substantially parallel with each other, and a base portion provided at one end of the bending vibration arm. Grooves are formed on said one and the other main faces, respectively, and a through hole is formed between said one main face and the other main face and communicated with the grooves.

The inventors have tried to form grooves on both main faces of a bending vibration arm and a through hole communicated with both grooves at the same time. That is, it is known to provide grooves on both main faces of the bending vibration arm. In this case, however, the cross section of the groove is normally tapered or curved and not rectangular. The effect of reducing the crystal impedance is limited. When the through hole communicated with the grooves is provided, it becomes easier to obtain the groove having a cross section similar to a rectangle around the through hole. The crystal impedance of the bending vibration arm can thereby be reduced to improve the sensitivity.

A third aspect of the present invention provides a vibrator comprising a first bending vibration arm vibrating in bending mode along a specified plane, a second bending vibration arm vibrating in bending mode along the specified plane, and a base portion provided between the first and second vibration arms. The vibrator has one main face, and a groove is continuously formed in the first vibration arm, the second vibration arm and the base portion on the one main face.

A fourth aspect of the present invention provides a vibrator comprising a first bending vibration arm vibrating in bending mode along a specified plane, a second bending vibration arm vibrating in bending mode along the specified plane, and a base portion provided between the first and second vibration arms. The vibrator has one main face, and the first and second vibration arms are formed along a substantially straight line, and a groove is continuously formed in the first bending vibration arm the base portion at the one main face.

As described above, it is known to form grooves on both main faces of a bending vibration arm. In this case, however, the cross section of the groove is normally tapered or curved and not rectangular. The effect of reducing the crystal impedance is not considerable. Such a tendency is most considerable at the inner end portion of the groove in the arm near the base portion. The inventors have considered to form an integrated groove over a plurality of the bending vibration arms and the base portion. Such an integrated groove does not have inner ends on the side of the base portion in the arm. The cross section of the groove can be more easily adjusted to a substantially rectangular shape. It is thus possible to further reduce the crystal impedance of the bending vibration arm and to improve the sensitivity.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 6 is a perspective view showing a vibrator 20C according to the first aspect of the present invention, in which grooves 25 and 6 and weight portions 9 and 12 are formed in bending vibration arms 14 and 15, respectively, and the groove 25 of the bending vibration arm 14 has a tapered portion 25a.

FIG. 7 is a perspective view showing a vibrator 20D according to the first aspect of the present invention, in which grooves 5 and 6 and weight portions 9 and 12 are formed in bending vibration arms 14 and 15, respectively, and the groove 25 of the bending vibration arm 14 has a tapered portion 25a.

DETAILED DESCRIPTION OF THE INVENTION

The present invention will be described below further in detail referring to the following figures.

Figure 1:
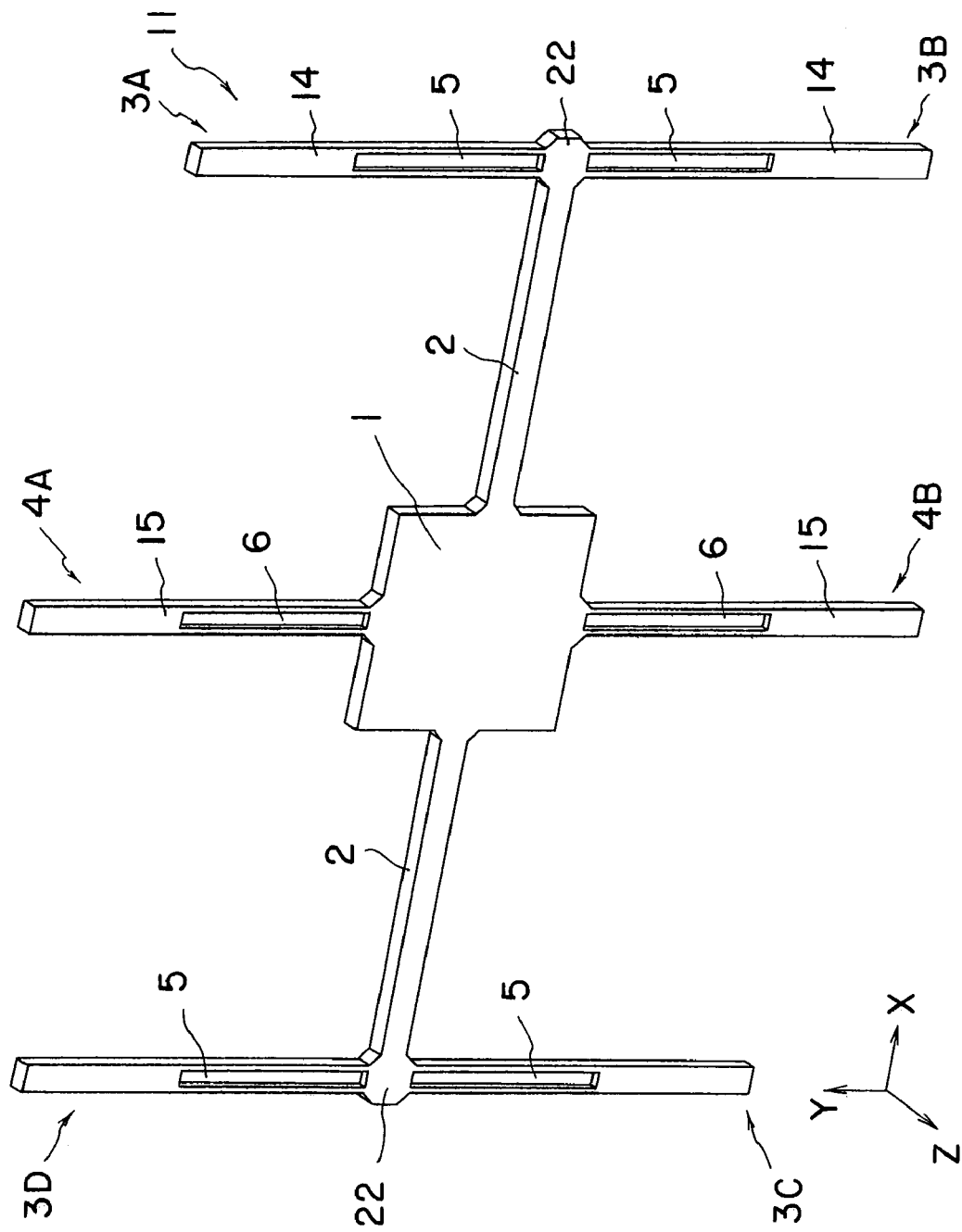
FIG. 1 is a perspective view schematically showing a vibrator 11 according to a comparative example having bending vibration arms 14 and 15 with grooves 5 and 6, respectively.

A vibrator of a comparative example is described first. FIG. 1 is a perspective view showing a vibrator 11 according to a comparative example. The vibrator 11 has a base portion 1 and a pair of supporting portions 2 protruding from the base portion 1. A bending vibration arm (driving vibration arm) 14 is protruded from each tip end 22 of each supporting portion 2 in a direction perpendicular to the supporting portion 2 to form each of driving vibration parts 3A, 3B, 3C and 3D. Further, a pair of elongate bending vibration arms 15 are protruded from the periphery of the base portion 1. The arms 15 constitute detection vibration parts 4A and 4B, respectively.

Each of the bending vibration arms 14 and 15 vibrates in bending mode along an X-Y plane (specified plane) in the present example. A groove 5 is formed on each of main faces of each bending vibration arm 14. The arm thus has a cross sectional shape of "H" character. A groove 6 is formed on each of the main faces of each bending vibration arm 15, so that the arm has a cross sectional shape of "H" character.

Such a vibrator has a relatively high sensitivity. The lengths of the vending vibration arms 14 and 15 needs to be reduced, however, to miniaturize the vibrator, in which case the sensitivity is lowered.

Figure 2:
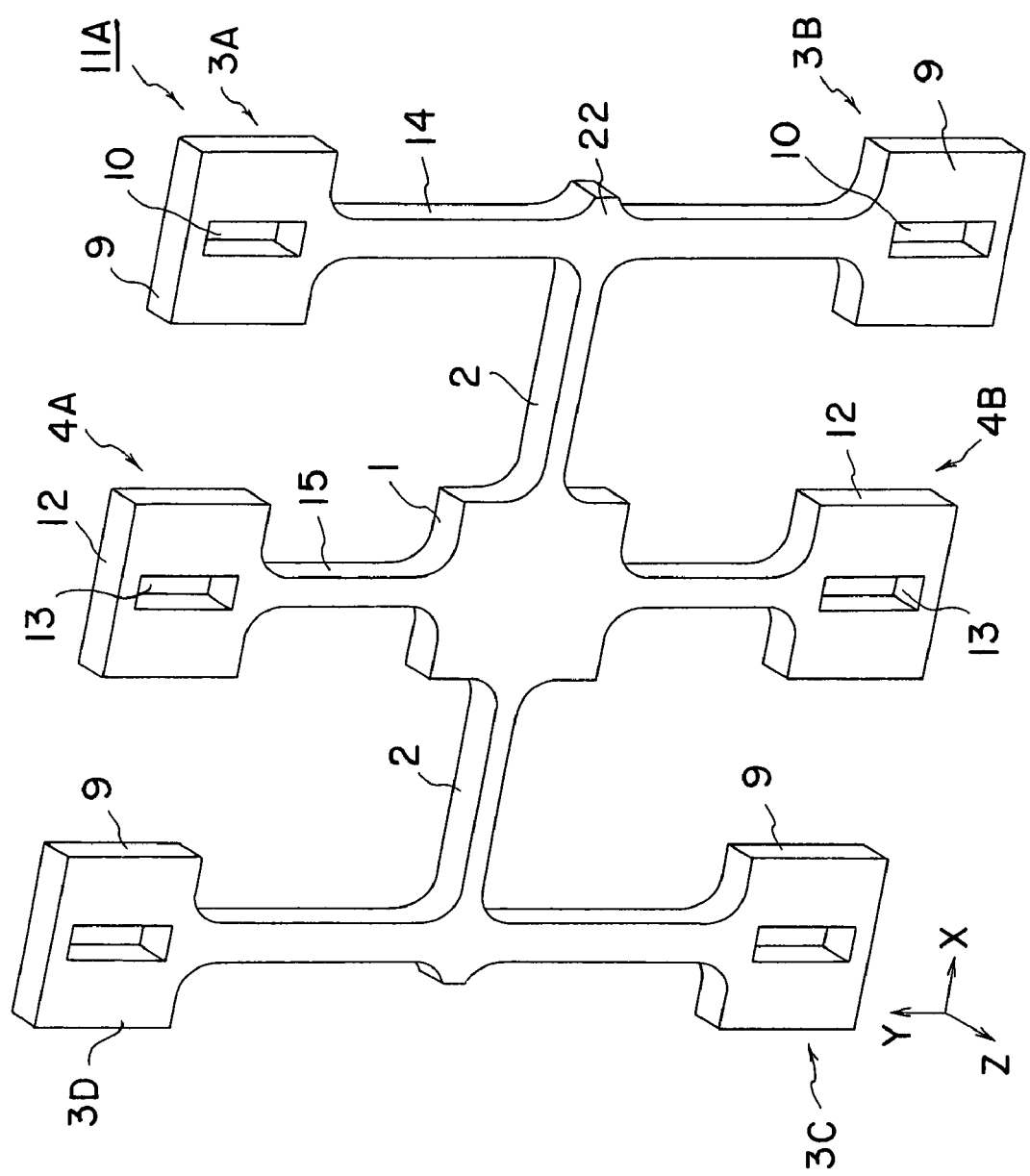
FIG. 2 is a perspective view schematically showing a vibrator 11A according to a comparative example having bending vibration arms 14 and 15 with weight portions 9 and 13, respectively.

FIG. 2 shows a vibrator 11A according to a comparative example. In the present example, a weight portion 9 is provided at the tip end of each driving vibration arm 14, and a weight portion 12 is provided at the tip end of each detection vibration arm 15.

Figure 3:
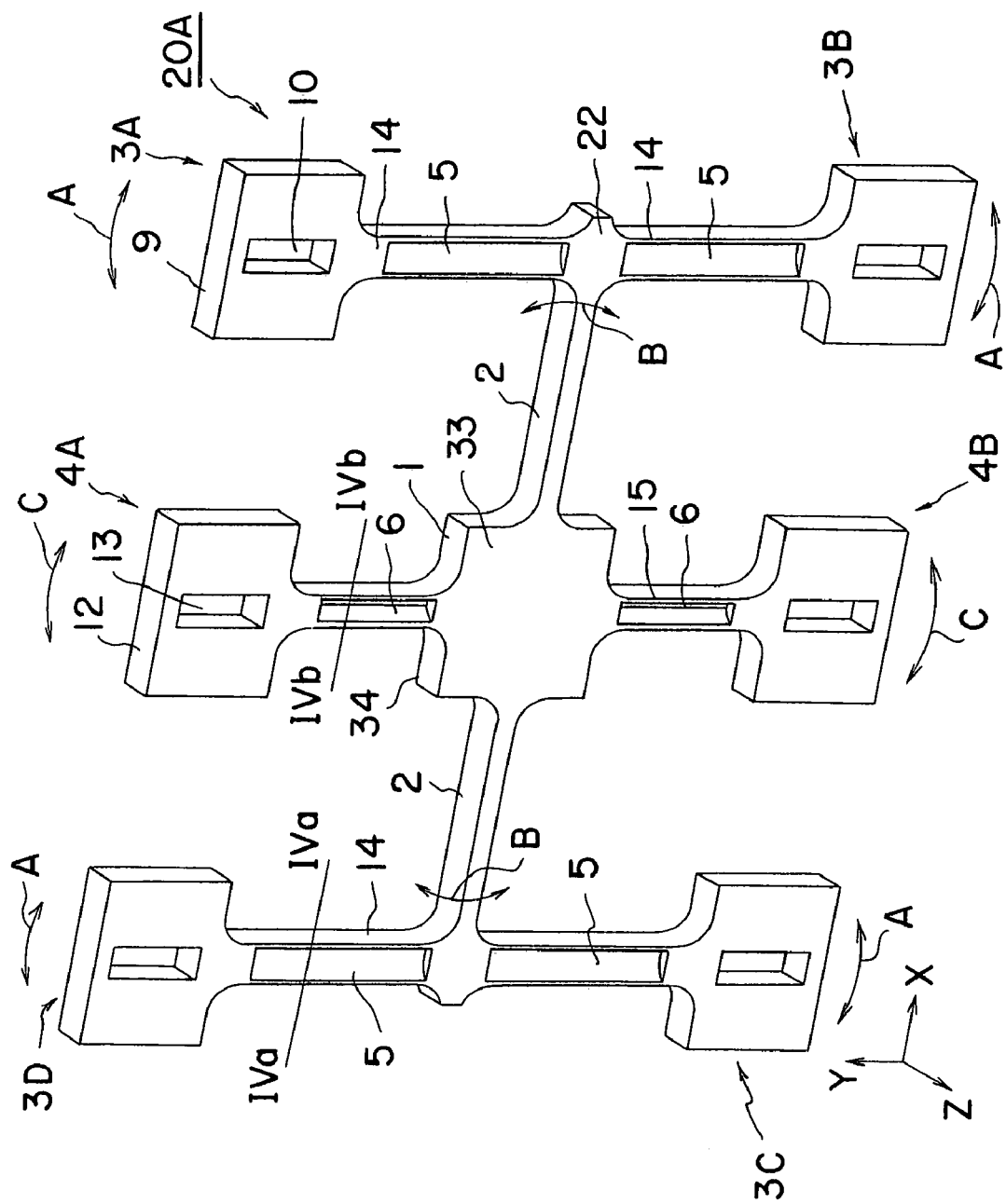
FIG. 3 is a perspective view showing a vibrator 20A according to the first aspect of the present invention, the vibrator having bending vibration arms 14 and 15 having grooves 5 and 6 and weight portions 9 and 12, respectively.

FIG. 3 is a perspective view showing a vibrator 20A according to the first aspect of the present invention. The vibrator 20A has a base portion 1 and a pair of supporting portions 2 protruding from the base portion 1. A bending vibration arm (driving vibration arm) 14 is protruded from each base portion 22 at the tip end of each supporting portion 2 in a direction perpendicular to the supporting portion 2. A weight portion 9 is provided at the tip end of each driving vibration arm 14. A through hole 10 is formed in each weight portion 9. Each of driving vibration parts 3A, 3B, 3C and 3D are thus formed. Further, a pair of elongate bending vibration arms 15 are protruded from the periphery of the base portion 1. A weight portion 12 is provided at the tip end of each arm 15. A through hole 13 is formed in each weight portion 12. The arms 15 thus constitute detection vibration parts 4A and 4B, respectively. 33 represents one main face of the vibrator 20A, and 34 represents the other main face.

Figure 4:
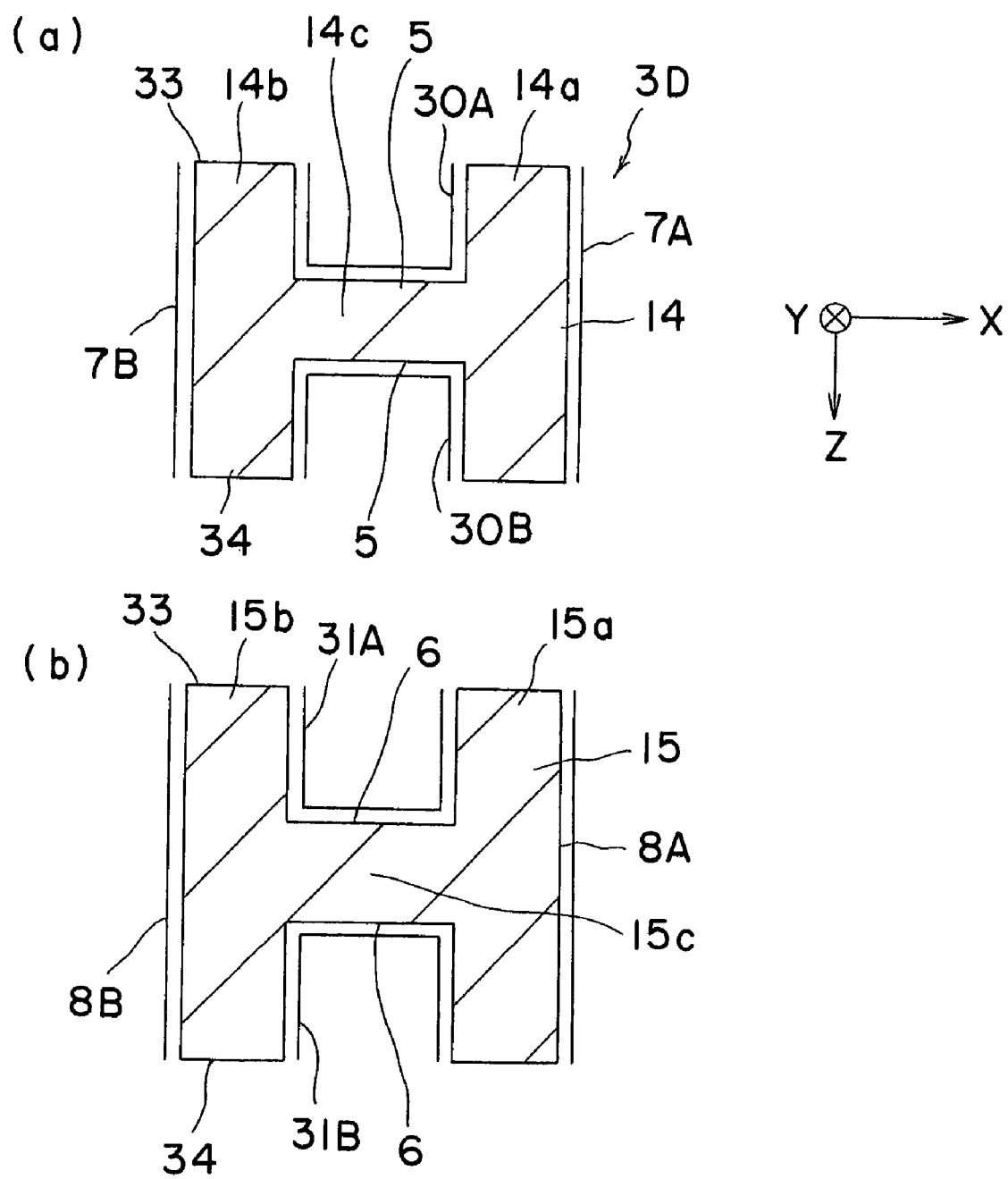
FIG. 4(a) shows a cross section of a driving vibration arm.
FIG. 4(b) shows a cross section of a detection vibration arm.

The cross sectional shape of the driving vibration arm 14 is shown in FIG. 4(a). An elongate groove 5 is formed on one main face 33 of the arm 14, and another elongate groove 5 is formed on the other main face 34. The arm 14 thus substantially has a cross sectional shape of "H" character. In other words, the bending vibration arm 14 has a pair of elongate wider parts 14a and 14b and a thinner part 14c connecting the wider parts.

The driving vibration arms 14 may be excited by a method not particularly limited. For example, electrodes 7A and 7B are provided on the side face of the driving vibration arm 14, and opposing electrodes 30A and 30B are provided on the wall surface facing the groove 5, so that an alternating voltage signal may be applied on the electrodes 7A, 7B and opposing electrodes 30A, 30B. It is thus possible to excite bending vibration in the driving vibration arm 14 along an X-Y plane.

When the driving vibration arms 14 are vibrated as an arrow "A" and the vibrator 20A is turned around a Z-axis, a pair of supporting portions 2 are vibrated as an arrow "B" in bending vibration mode around the roots of the supporting portions 2 to the base portion 1. Responsive to this, the detection vibration arms 15 are vibrated as an arrow "C" in bending vibration mode around the roots of the arms to the base portion 1. A detection signal is generated based on the bending vibration and then processed in a detection circuit.

The cross sectional shape of the detection vibration arm 15 is shown in FIG. 4(b). An elongate groove 6 is formed on one main face 33 of the arm 15, and another elongate groove 6 is formed on the other main face 34. The arm 15 thus substantially has a cross sectional shape of "H" character. In other words, the bending vibration arm 15 has a pair of elongate wider parts 15a and 15b and a thinner part 15c connecting the wider parts.

Methods for generating a signal based on the vibration of the detection vibration arm 15 are not limited. For example, electrodes 8A and 8B are provided on the side faces of the detection vibration arms 15, and opposing electrodes 31A and 31B are provided on the wall surface facing the groove 6. The vibration of the detection vibration arm 15 in bending vibration mode along an X-Y plane generates a signal voltage between the electrodes 8A, 8B and opposing electrodes 31A, 31B.

Figure 5:
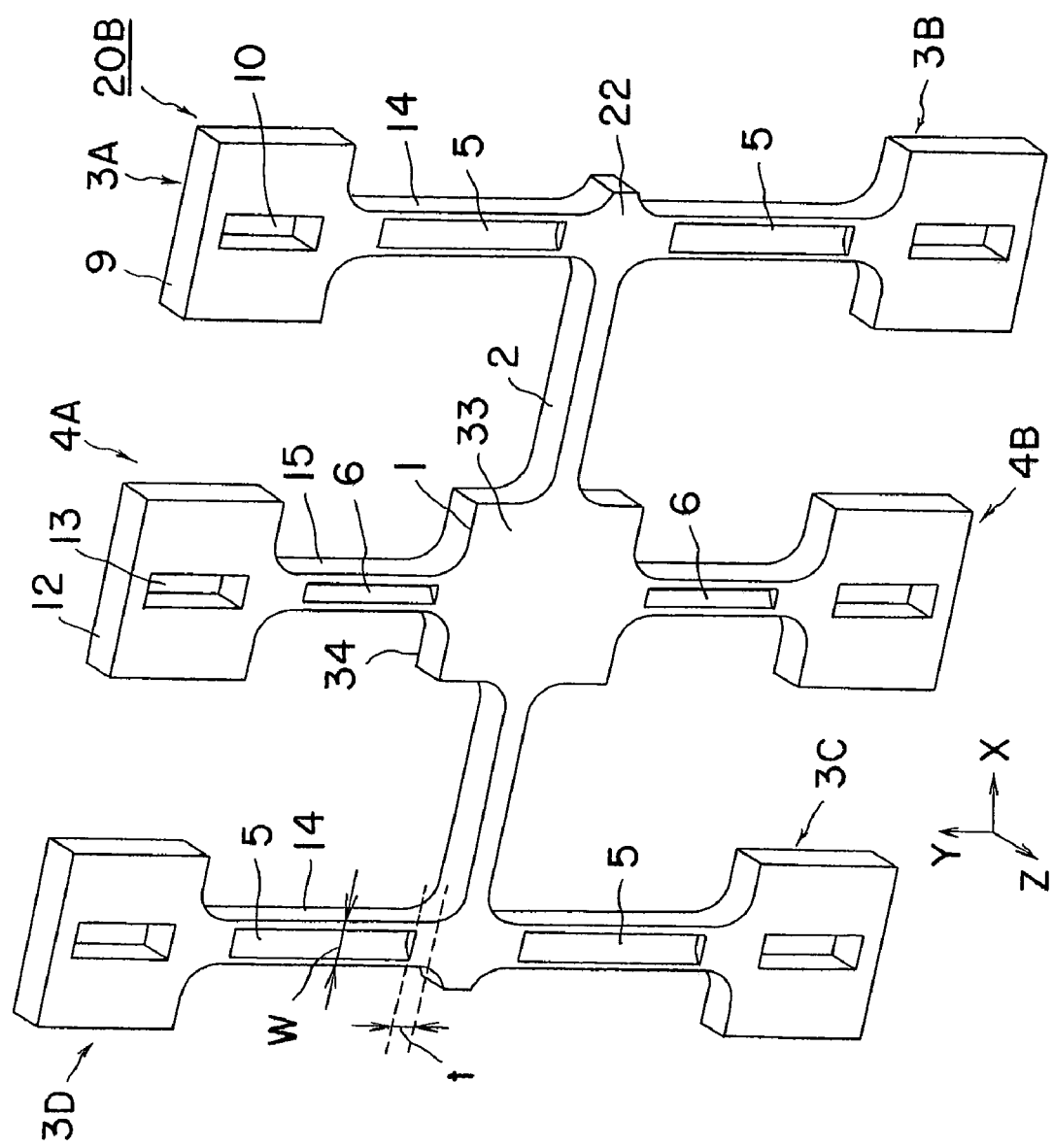
FIG. 5 is a perspective view showing a vibrator 20B according to the first aspect of the present invention, having bending vibration arms 14 and 15 having grooves 5 and 6 and weight portions 9 and 12 formed therein, respectively.

FIG. 5 is a perspective view showing a vibrator 20B according to the first aspect of the present invention. The whole construction and operation of the vibrator 20B is same as those of the vibrator 20A shown in FIG. 3, and the explanation is omitted. According to the present example, in the driving vibration arm 14, the end of the groove 5 is distant from the root of the driving vibration arm to the base portion 22 by a height "t". When "t" is too small, the withstand voltage tends to be reduced so that the vibrator may be easily broken upon the application of voltage. The distance "t" is preferably 5 percent or more, and more preferably, 25 percent or more, of the width "W" of the bending vibration arm, for improving the withstand voltage of the vibrator.

On the other hand, if "t" is too large, the sensitivity per a unit current tends to be reduced. The distance "t" is preferably 150 percent or lower, and more preferably, 70 percent or lower, for improving the sensitivity of the bending vibration arm. Further, such a construction may be applied to the detection vibration arms 15.

Figure 6:
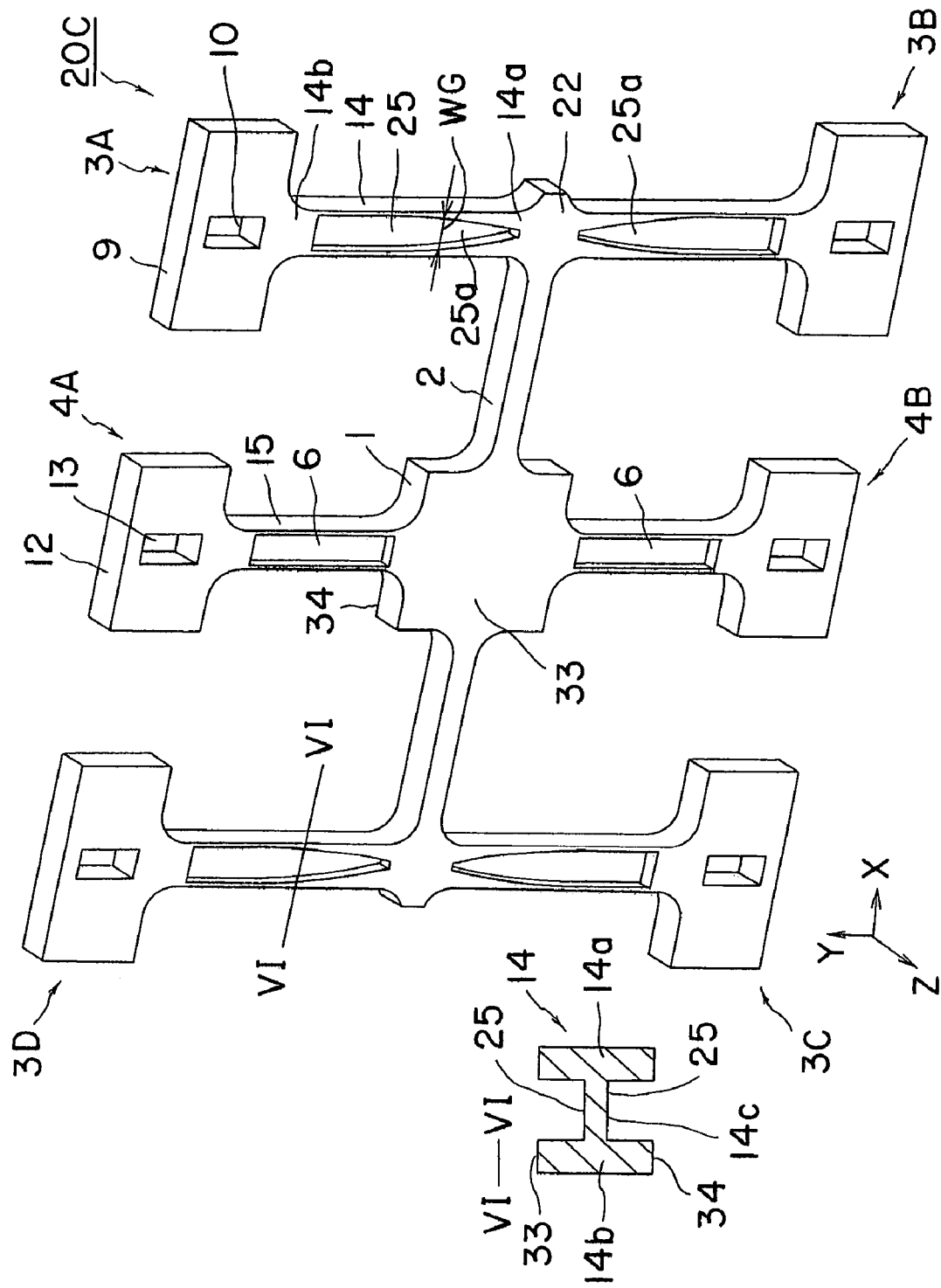
Figure 7:
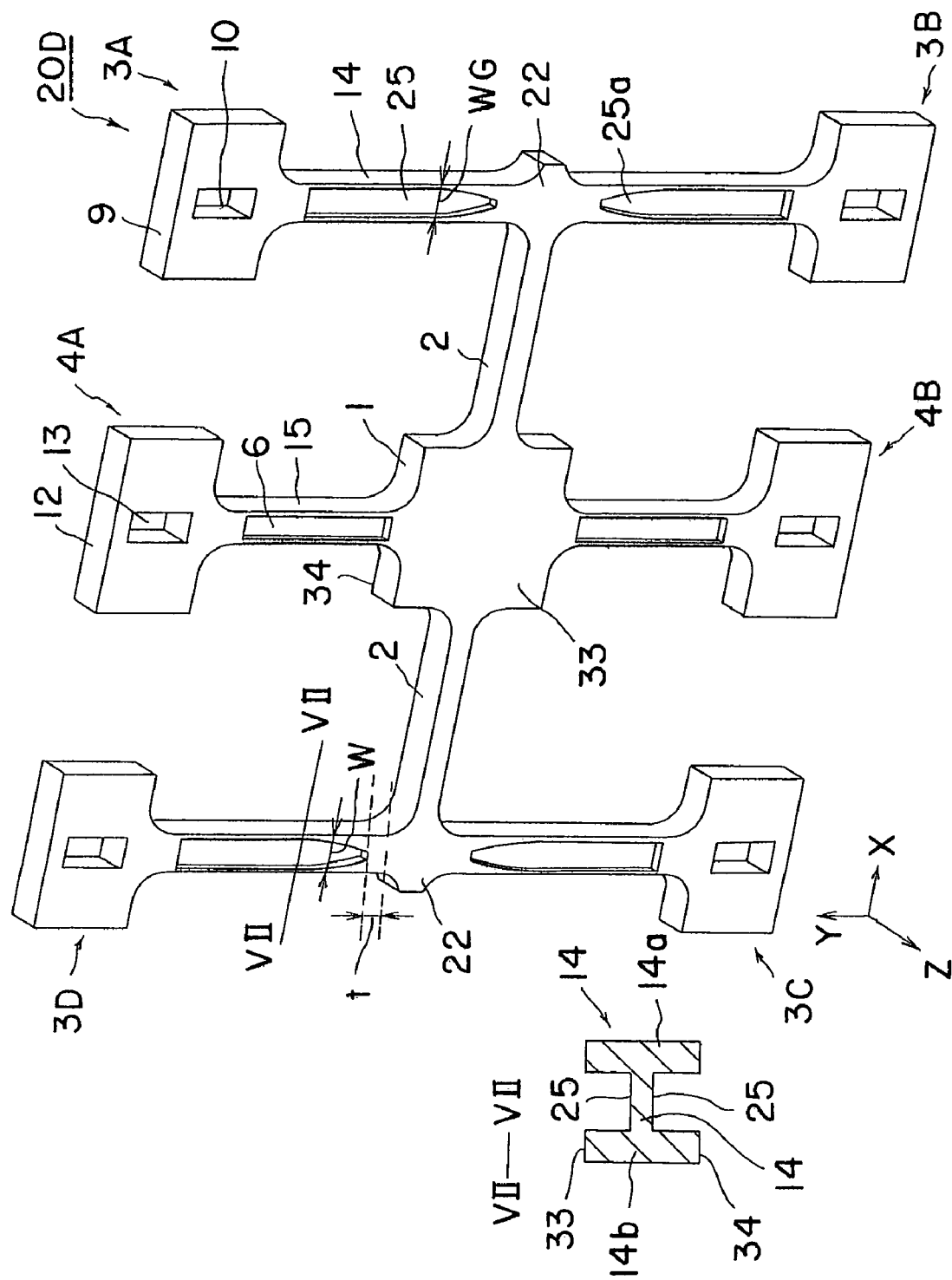

In a preferred embodiment, the groove has a tapered portion whose width is reduced closer to the base portion. It is thus possible to facilitate the vibration of the driving vibration arm so that the crystal impedance is further reduced and the sensitivity is improved. FIGS. 6 and 7 are perspective views schematically showing vibrators 20C and 20D, respectively, according the present embodiment. In the vibrator 20C, each groove 25 on each main face of the driving vibration arm 14 has a tapered portion 25a. In each of the tapered portions 25a, the width "WG" of the groove is reduced closer to the base portion 22.

In the vibrator 20D shown in FIG. 7, each groove 25 on each main face of the driving vibration arm 14 has a tapered portion 25a. In each of the tapered portions 25a, the width "WG" of the groove is reduced closer to the base portion 22. Further, in the driving vibration arm 14, the tip end of the groove 25 is distant from the root of the driving vibration arm to the base portion 22 by a height "t".

Figure 8:
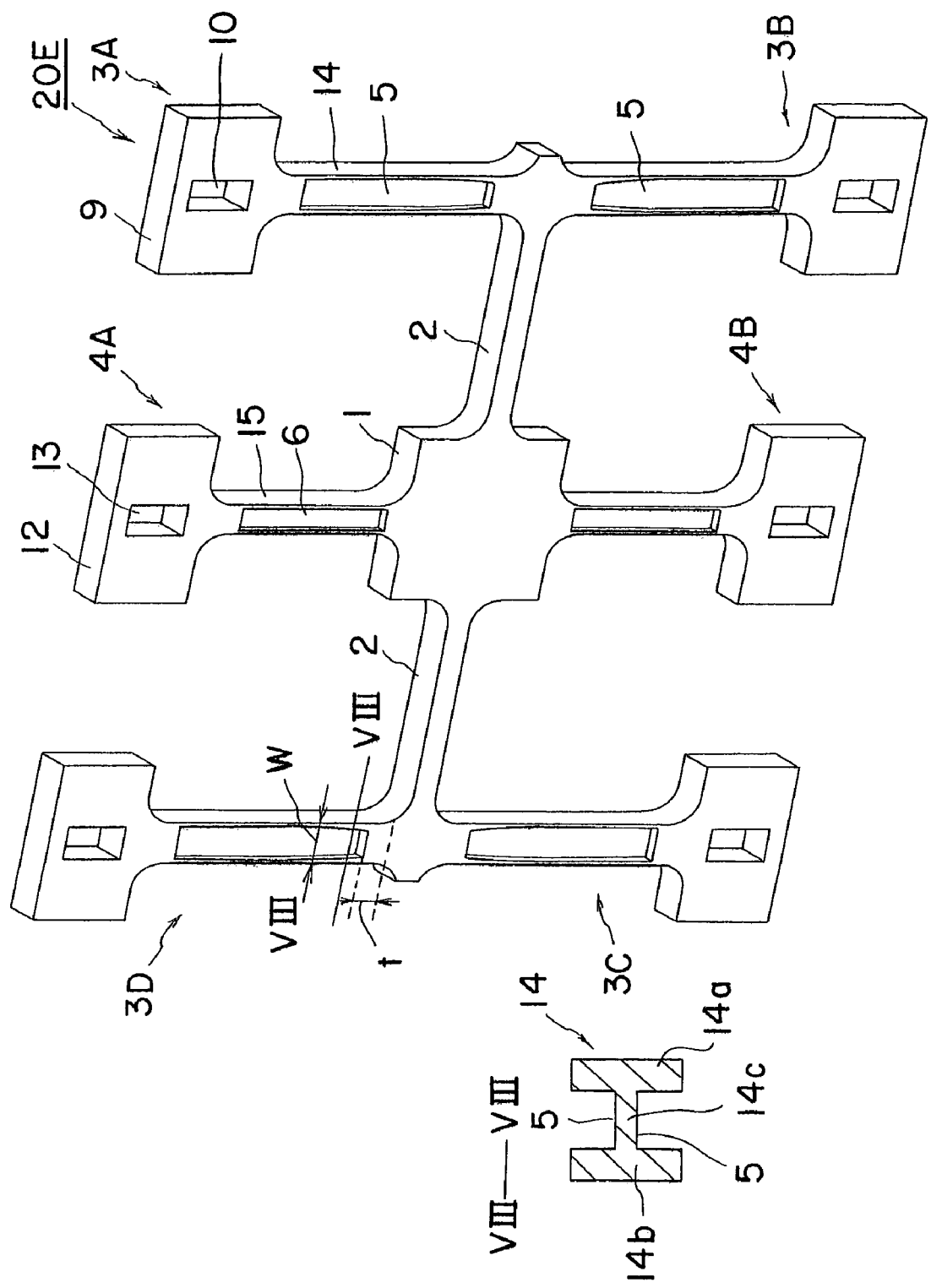
FIG. 8 is a perspective view schematically showing a vibrator 20E according to an embodiment of the present invention, in which grooves 5 and 6 and weight portions 9 and 12 are formed in bending vibration arms 14 and 15, respectively.

FIG. 8 is a perspective view schematically showing a vibrator 20E according to the first aspect of the present invention. The vibrator 20E is substantially same as the vibrator 20B (FIG. 5), except that the widths of the wider parts 14a and 14b are further reduced and the width of the groove is increased.

Figure 9:
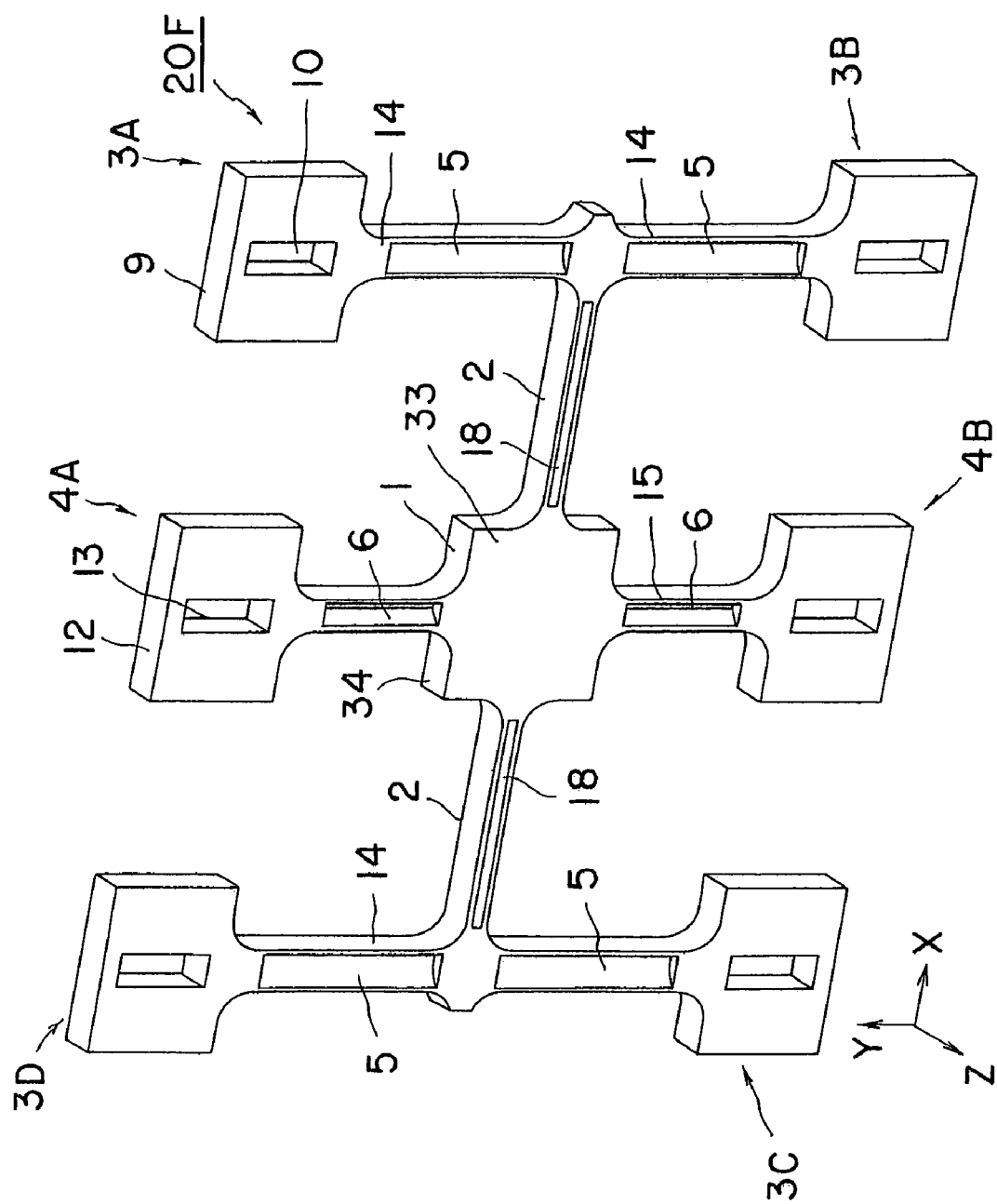
FIG. 9 is a perspective view schematically showing a vibrator 20F according to one aspect of the present invention, having a supporting portion 2 with a groove 18 formed therein.

FIG. 9 is a perspective view schematically showing a vibrator 20F according to the first aspect of the present invention. The vibrator 20F is substantially same as the vibrator 20A (FIG. 3), except that the vibrator 20F has elongate grooves 18 formed on the main faces 33 and 34, respectively of each supporting portion 2.

Figure 10:
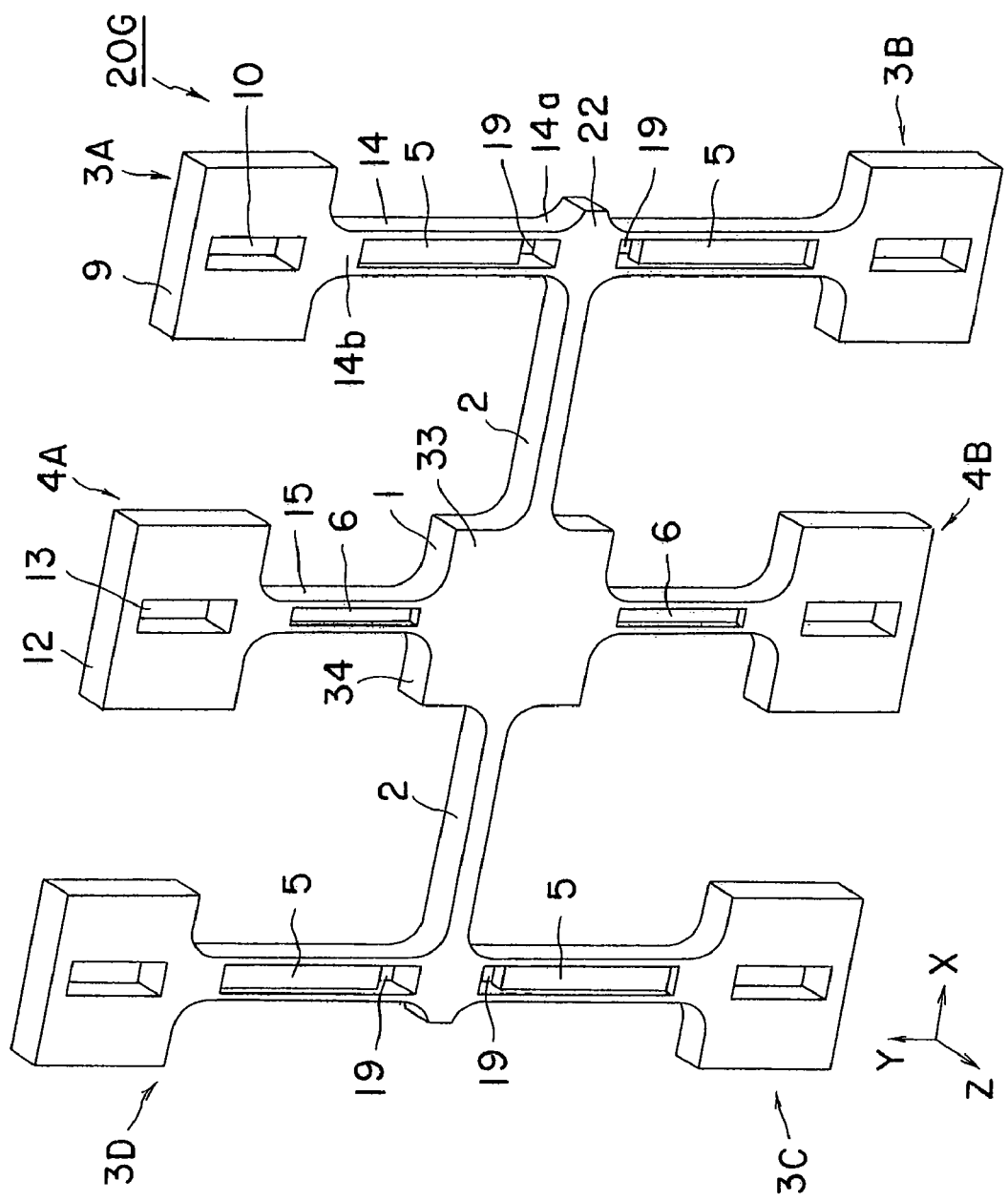
FIG. 10 is a perspective view schematically showing a vibrator 20G according to first and second aspects of the present invention, having a groove 5 and a through hole 19 communicated with the groove 5 formed therein.

FIG. 10 is a perspective view schematically showing a vibrator 2G according to the first and second aspects of the present invention. The vibrator 20G is substantially same as the vibrator 20A (FIG. 3), except that a through hole 19 is formed between the main faces 33 and 34 of each driving vibration arm 14. The through holes 19 each communicate with the grooves 5, respectively. In the present example, the through hole 19 communicates with the groove 5 at the end of groove 5 near the base portion 22.

Figure 18:
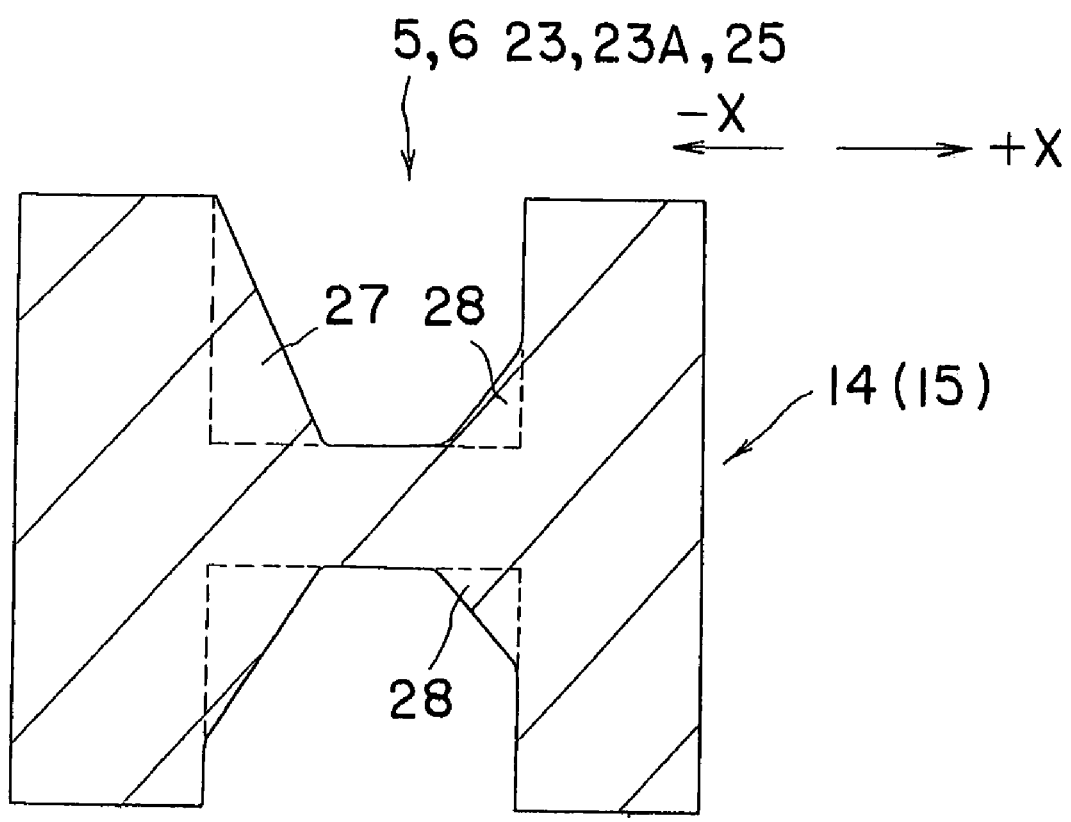
FIG. 18 shows an example of a cross section of a bending vibration arm.
Figure 19:
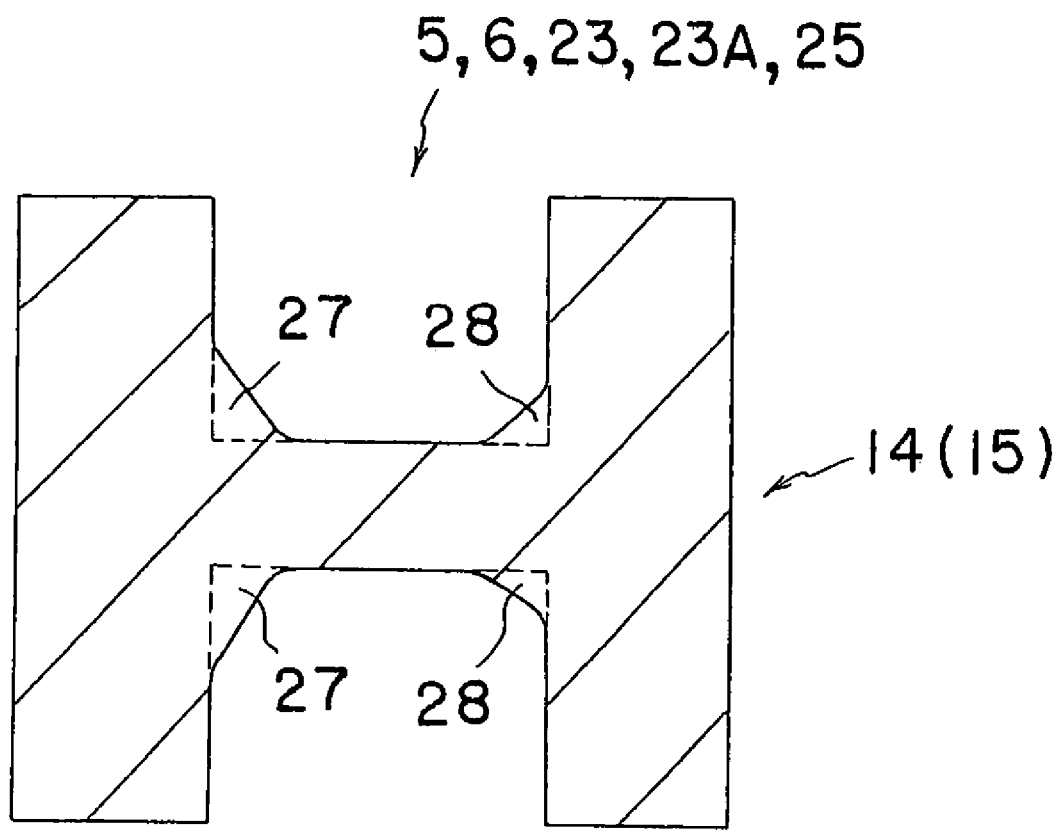
FIG. 19 shows an example of a cross section of a bending vibration arm, in which tapered portions 27 and 28 are made smaller by the formation of through holes.

The advantageous effects of providing the through hole are described below. When the grooves 5 and 6 are formed, for example by etching, tapered portions 27 and 28 are formed so that the groove does not have a cross sectional shape of a rectangle, as schematically shown in FIG. 18. When a vibrator of quartz is formed, for example by wet etching, the dimensions and inclinations of each of the tapered portions 27 and 28 are different from each other in the +X and −X directions. As the tapered portion becomes larger, the sensitivity of the bending vibration arm is reduced. When the through hole communicates with the groove, the dimension of the tapered portion is made smaller near the through hole as shown in, for example, FIG. 19.

The above tapered portions particularly tend to be larger at the ends of the grooves 5 and 6. The through hole is preferably formed at the end of each of the grooves 5 and 6, and most preferably, at both ends of each of the grooves, respectively.

Figure 11:
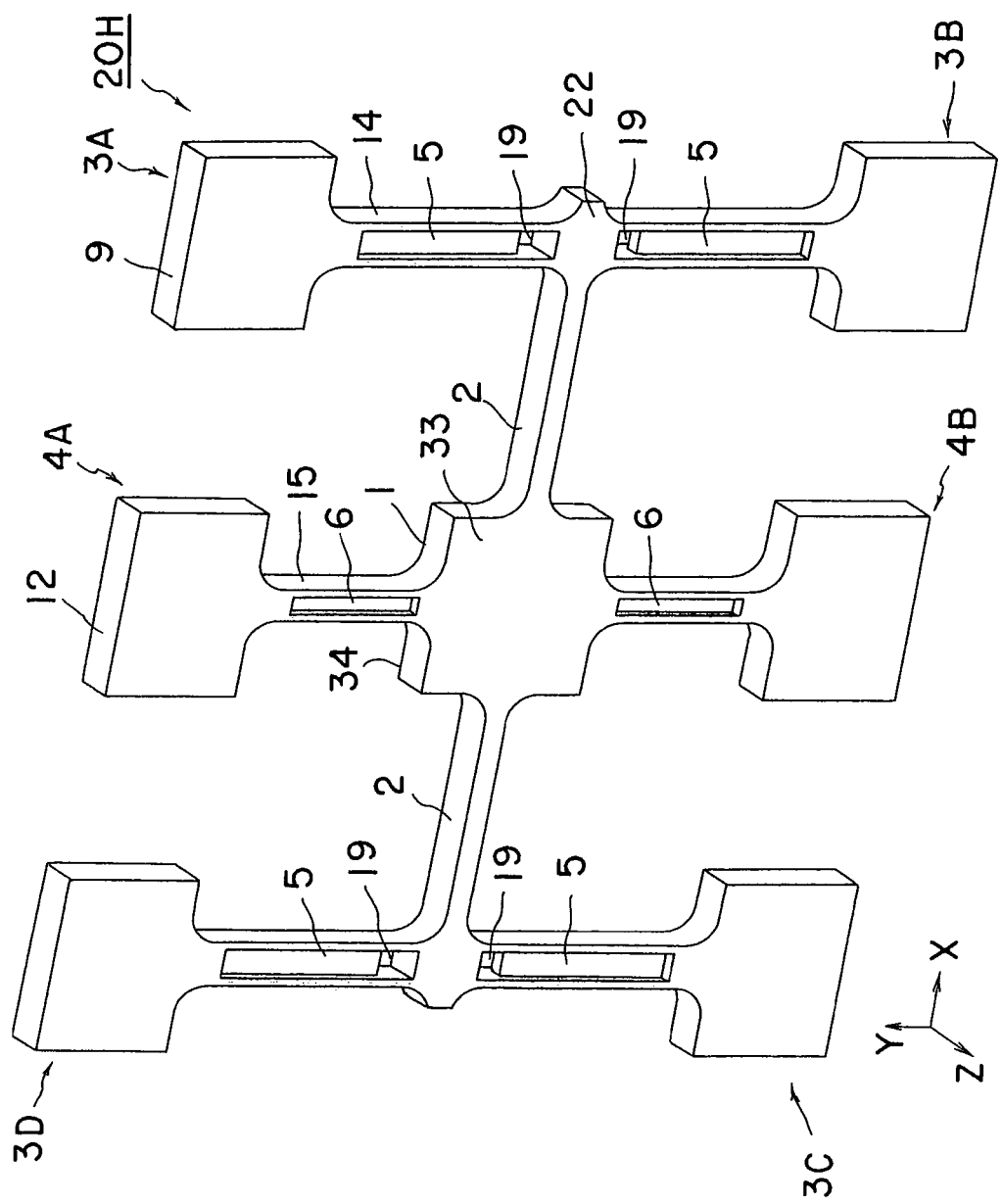
FIG. 11 is a perspective view schematically showing a vibrator 20H according to the first and second aspects of the present invention, having a groove 5 and a through hole 19 formed therein.

FIG. 11 is a perspective view schematically showing a vibrator 20H according to the first and second aspects of the present invention. The vibrator 20H is substantially same as the vibrator 20G of FIG. 10, except that through holes and are not formed in the weight portions 9 and 12, respectively.

Figure 12:
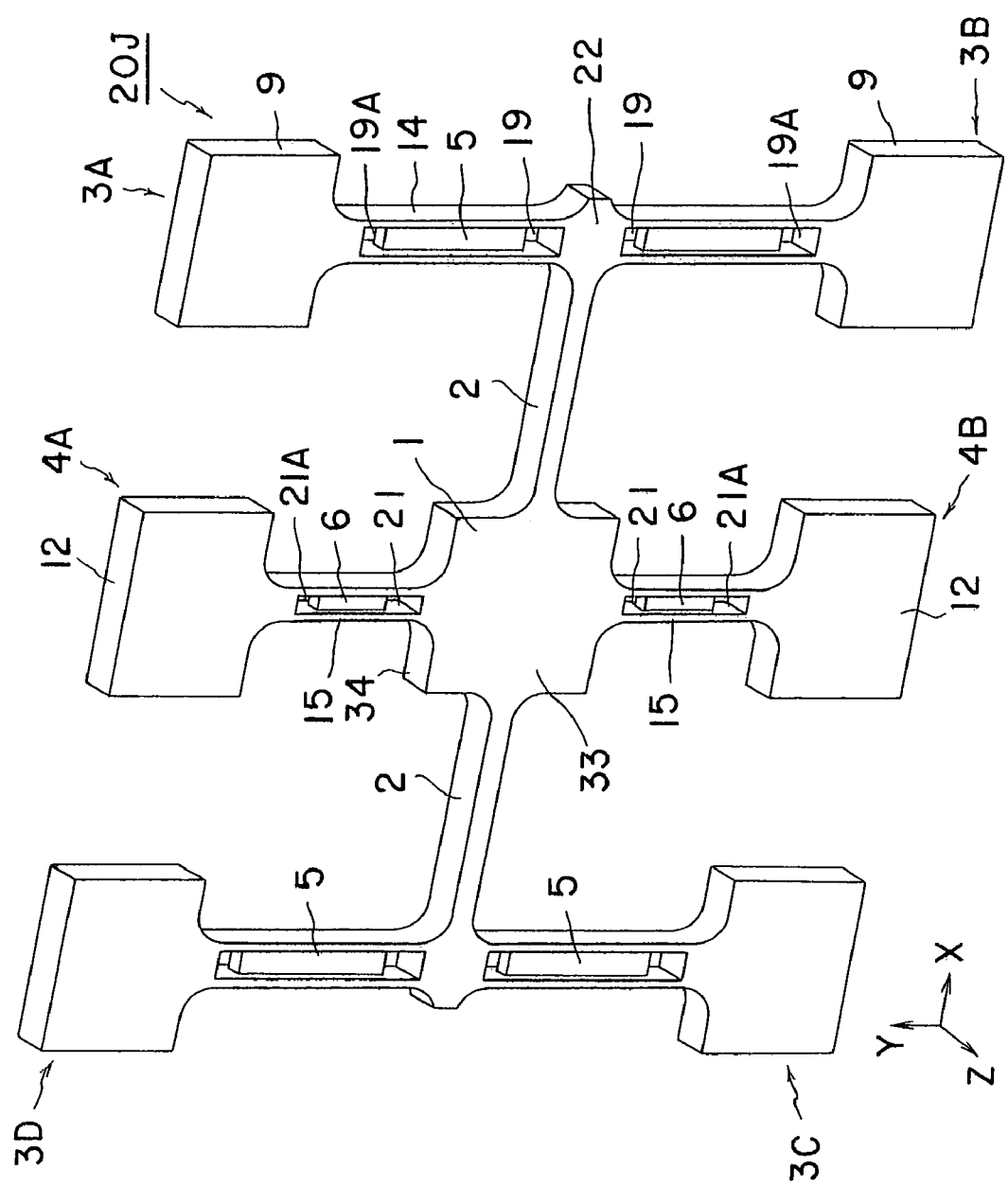
FIG. 12 is a perspective view schematically showing a vibrator 20J according to the first and second aspects of the present invention, having grooves 5 and 6, through holes 19 and 19A communicated with the groove 5 and through holes 21 and 21A communicated with the groove 6.

FIG. 12 is a perspective view schematically showing a vibrator 20J according to the first and second aspects of the present invention. The vibrator 20J is substantially same as the vibrator 20H of FIG. 11, except those through holes 19 and 19A are communicated with the groove 5 of the driving vibration arm 14 at both ends of the groove 5, respectively. Further, through holes 21 and 21A communicate with the groove 6 at both ends of the detection vibration arm 15, respectively.

Figure 13:
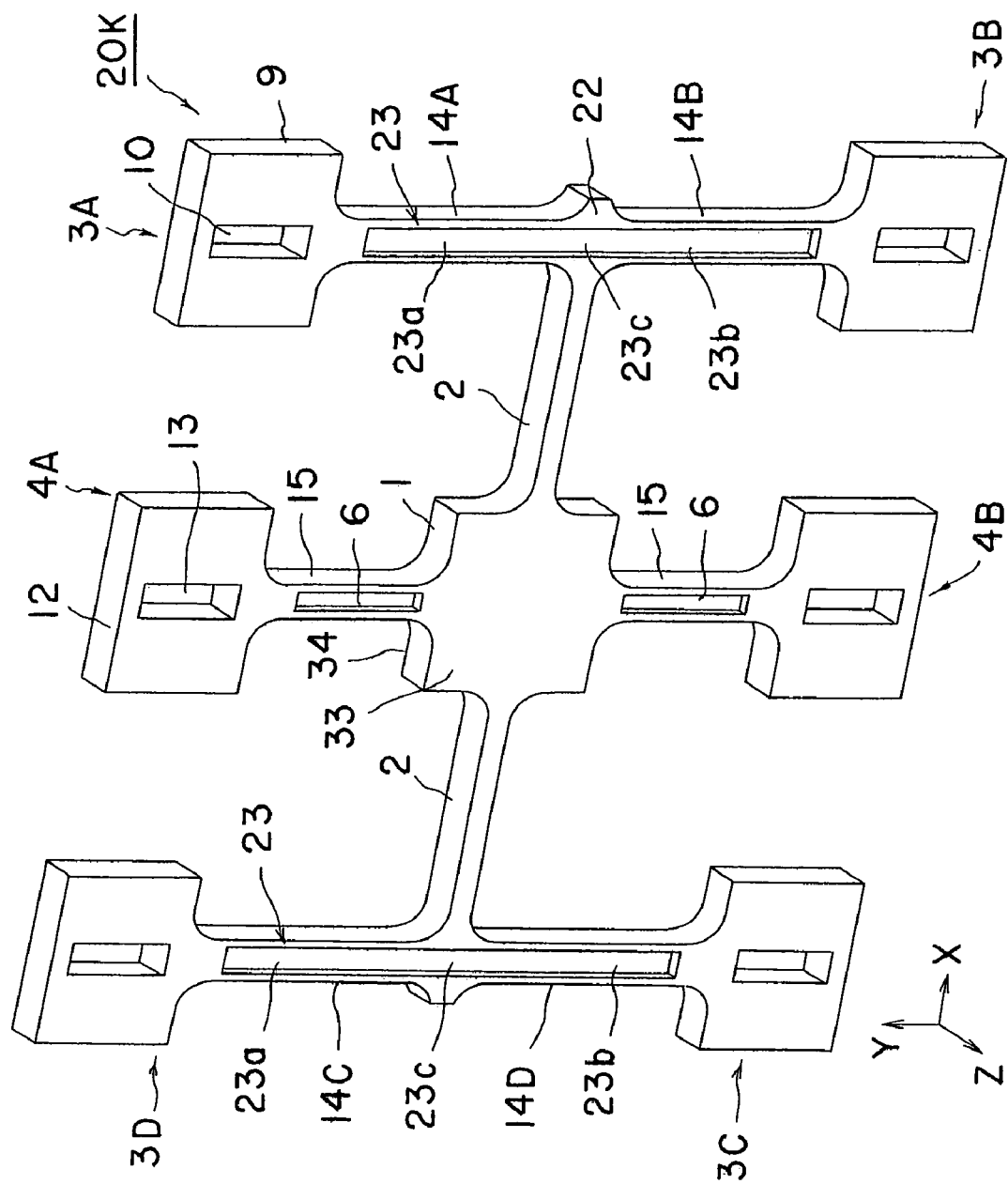
FIG. 13 is a perspective view schematically showing a vibrator 20K according to first and third aspects of the present invention, having bending vibration arms 14A, 14C, 14B and 14D and a base portion 22, in which grooves 23 are continuously formed in the arms 14A, 14B and base portion 22 and continuously formed in the arms 14C, 14D and the base portion 22, respectively.

FIG. 13 is a perspective view schematically showing a vibrator 20K according to first and third aspects of the present invention. The vibrator 20K is substantially same as the vibrator 20A (FIG. 3). In the vibrator 20K, however, grooves 23 are continuously formed in a first bending vibration arm 14A, a second bending vibration arm 14B and the base portion 22 on one main face 33 and the other main face 34, respectively. That is, the groove part 23 includes a groove 23a in the first bending vibration arm 14A, a groove part 14B in a second bending vibration arm 14B and a groove part 23c in the base portion 22, and the groove parts 23a, 23b and 23c are continuously formed. Further, grooves 23 are continuously formed in a first bending vibration arm 14C, a second bending vibration arm 14D and the base portion 22 on one main face 33 and the other main face 34, respectively. That is, the groove 23 includes a groove part 23a in the first bending vibration arm 14C, a groove part 14b in the second bending vibration arm 14B and a groove part 23c in the base portion 22, and the groove parts 23a, 23b and 23c are continuously formed.

As described above, the width of the tapered portion tends to be larger at the ends of the grooves 5 and 6 to contribute to an increase of the crystal impedance. On the contrary, in the present example, the groove is made continuous over a plurality of bending vibration arms, so that an end of the groove does not exist near the base portion 22 in each bending vibration arm. It is thus possible to reduce the dimension of the tapered portion on the inner wall surface facing the groove, so as to improve the sensitivity of the bending vibration arm.

Figure 14:
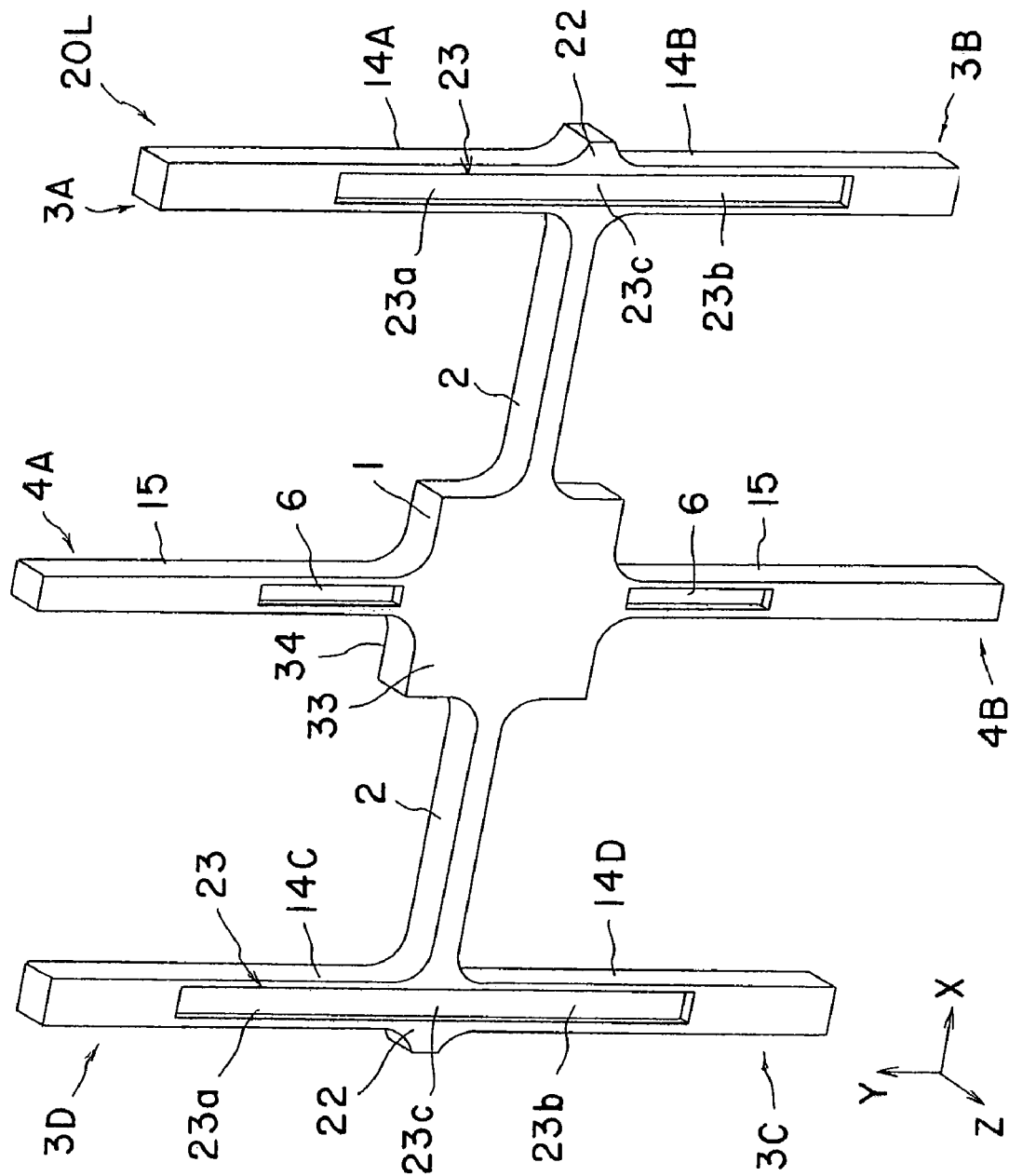
FIG. 14 is a perspective view schematically showing a vibrator 20L according to third aspect of the present invention having bending vibration arms 14A, 14C, 14B an 14D and a base portion 22, in which grooves 23 are continuously formed in the arms 14A, 14B and base portion 22 and continuously formed in the arms 14C, 14D and the base portion 22, respectively.

FIG. 14 is a perspective view schematically showing a vibrator 20L according to the third aspect of the present invention. The vibrator 20L is substantially same as the vibrator 20K (FIG. 13), except that weight portions are not provided at the tip ends of the driving vibration arm and detection vibration arms.

Figure 15:
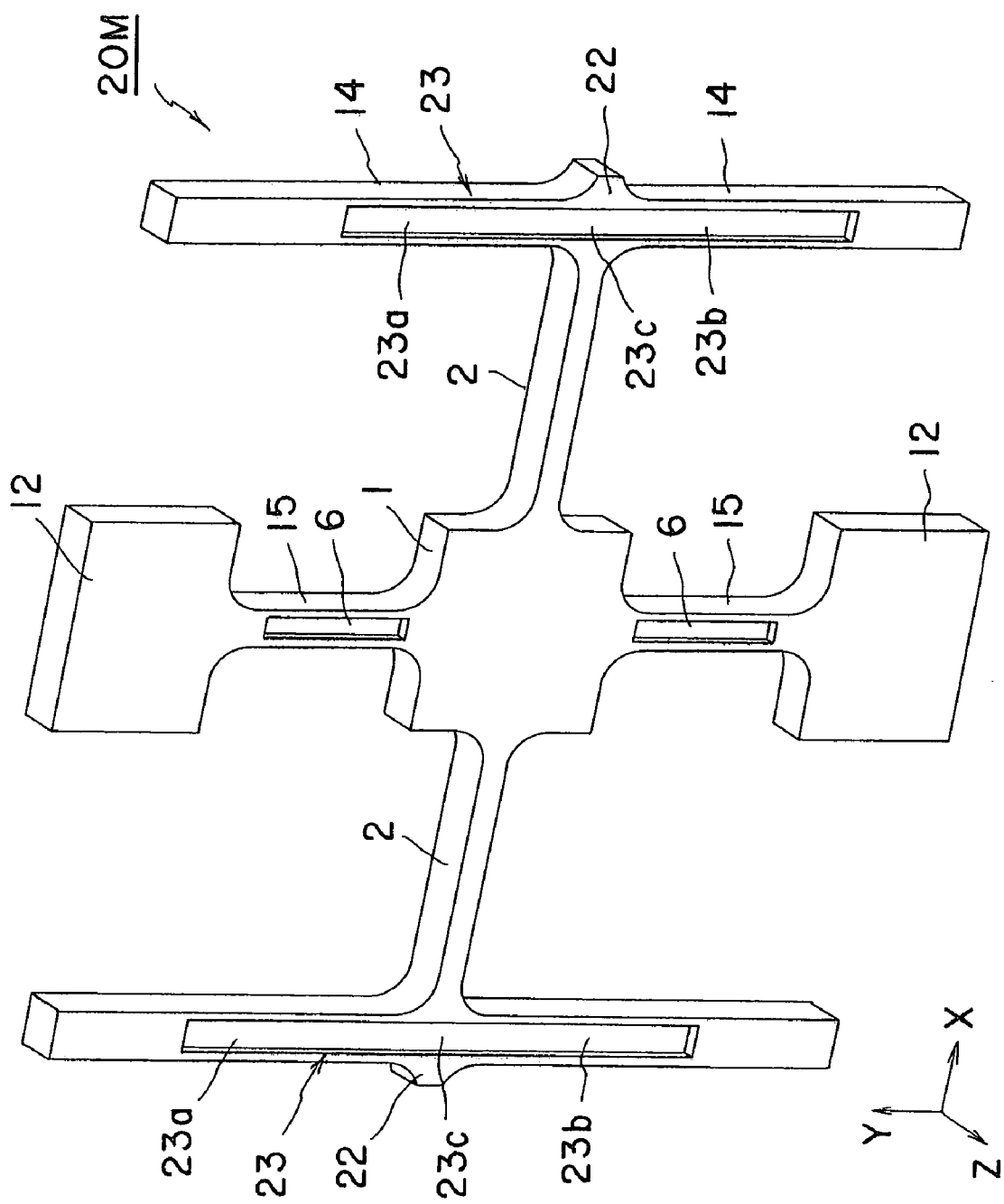
FIG. 15 is a perspective view schematically showing a vibrator 20M according to first and third aspects of the present invention, having bending vibration arms 14A, 14C, 14B an 14D and a base portion 22, in which grooves 23 are continuously formed in the arms 14A, 14B and base portion 22 and continuously formed in the arms 14C, 14D and the base portion 22, respectively. The bending vibration arm 15 has a weight portion 12.

FIG. 15 is a perspective view schematically showing a vibrator 20M according to the first and third aspects of the present invention. The vibrator 20M is substantially same as the vibrator 20K (FIG. 13), except that a weight portion is not provided at the tip end of each driving vibration arm and a weight portion 12 is provided at the tip end of each detection vibration arm.

Figure 16:
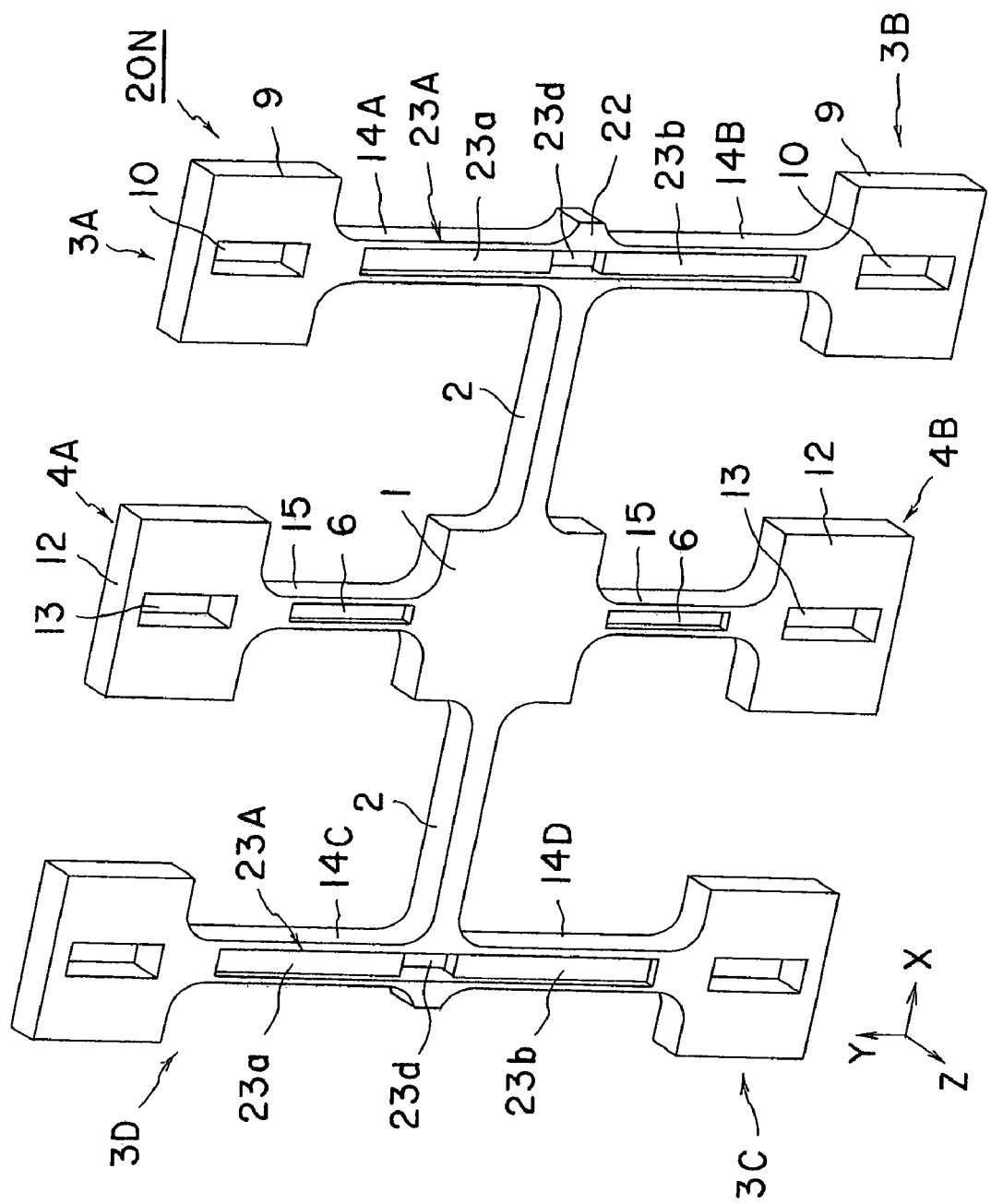
FIG. 16 is a perspective view schematically showing a vibrator 20N according to first, second and third aspects of the present invention, having bending vibration arms 14A, 14C, 14B and 14D and a base portion 22, in which grooves 23A are continuously formed in the arms 14A, 14B and base portion 22 and continuously formed in the arms 14C, 14D and the base portion 22, respectively. The base portion 22 has a through hole 23d formed therein.

FIG. 16 is a perspective view schematically showing a vibrator 20N according to the first, second and third aspects of the present invention. The vibrator 20N is substantially same as the vibrator 20K (FIG. 13). In the present example, however, the groove 23A includes groove parts 23a in the first bending vibration arms 14A and 14C, groove parts 23b in the second bending vibration arms 14B and 14D, and a through hole 23d in the base portion 22. The groove parts 23a, 23b and 23d are communicated with each other.

Figure 17:
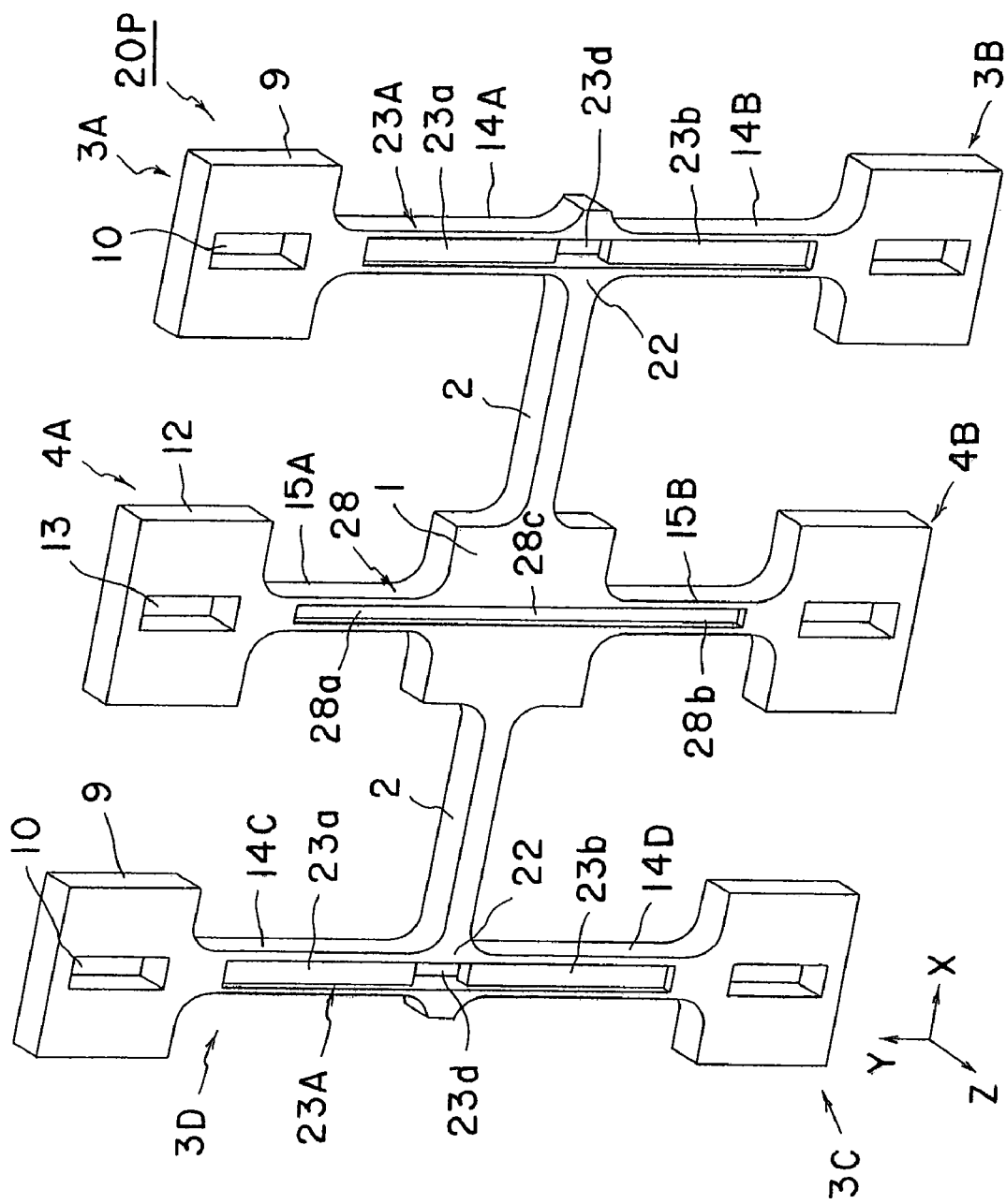
FIG. 17 is a perspective view schematically showing a vibrator 20P according to first, second and third aspects of the present invention, having bending vibration arms 15A and 15B and a base portion 22, in which a groove 28 is continuously formed in a plurality of bending vibration arms 15A, 15B and a base portion 1.

FIG. 17 is a perspective view schematically showing a vibrator 20P according to the first, second and third aspects of the present invention. The vibrator 20P is substantially same as the vibrator 20N (FIG. 16). In the vibrator 20P of the present example, however, the groove 28 includes a groove part 28a in the first bending vibration arm 15A, a groove part 28b in the second bending vibration arm 15B and a groove part 28c in the base portion 1. The groove parts 28a, 28b and 28c communicate with each other.

Figure 20:
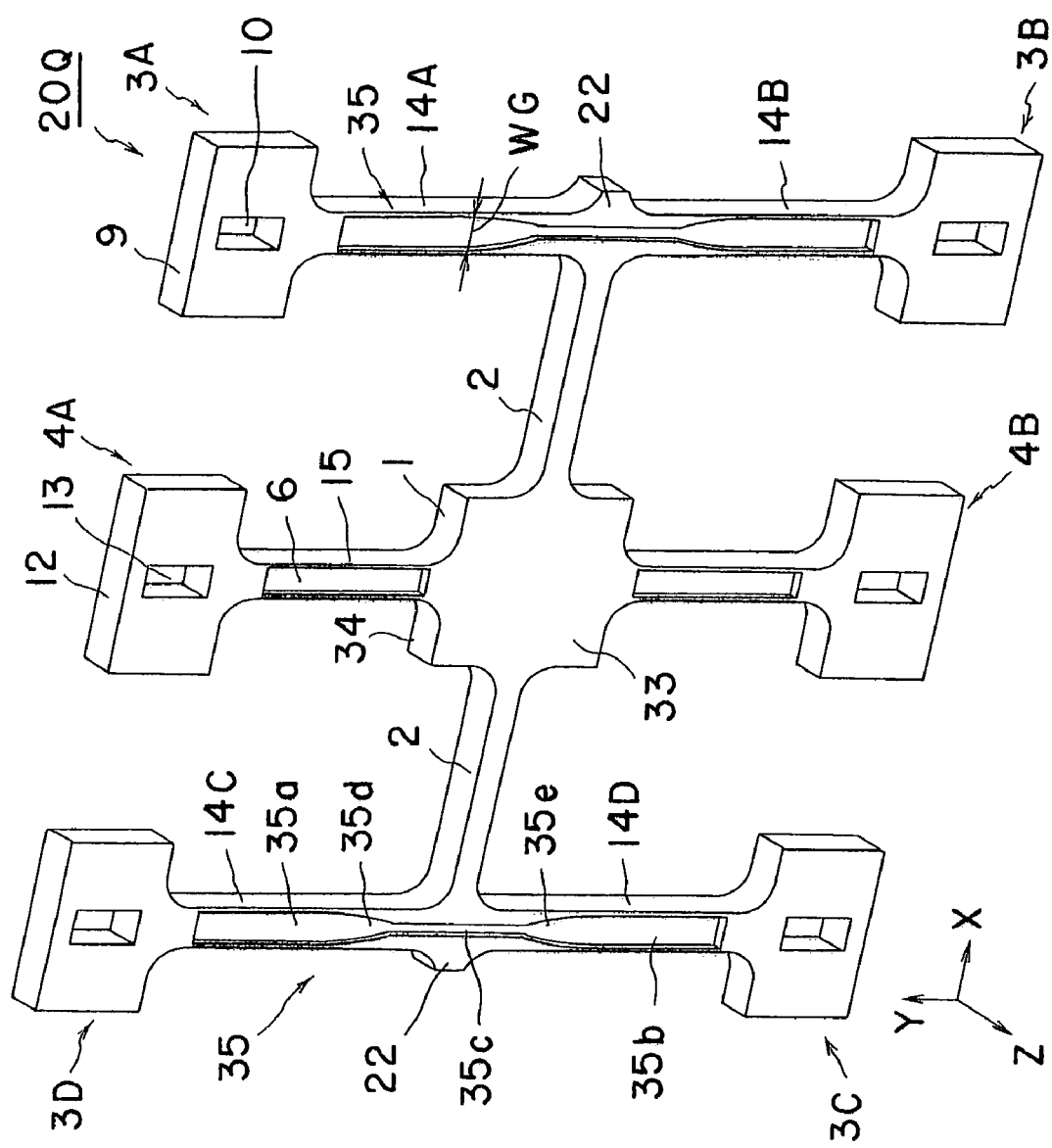
FIG. 20 is a perspective view schematically showing a vibrator 20Q according to first and third aspects of the present invention.

FIG. 20 is a perspective view schematically showing a vibrator 20Q according to the first and third aspects of the present invention. In the vibrator 20Q, grooves 35 are formed in the first bending vibration arms 14A, 14C, second bending vibration arms 14B, 14D and the base portion 22 on the one and the other main faces 33 and 34, respectively. That is, the grooves 35 includes groove parts 35a in the first bending vibration arms 14A, 14C, groove parts 35b in the second bending vibration arms 14B, 14D, and groove parts 35c in the base portions 22, respectively. The groove parts 35a, 35b and 35c communicate with each other. The groove 35a includes a tapered portion 35d at the end of the groove 35a near the base portion 22, where the width "WG" the groove is made smaller closer to the base portion 22. The groove 35b includes a tapered portion 35e at the end of the groove 35b near the base portion 22, where the width "WG" of the groove is made smaller closer to the base portion 22.

Figure 21:
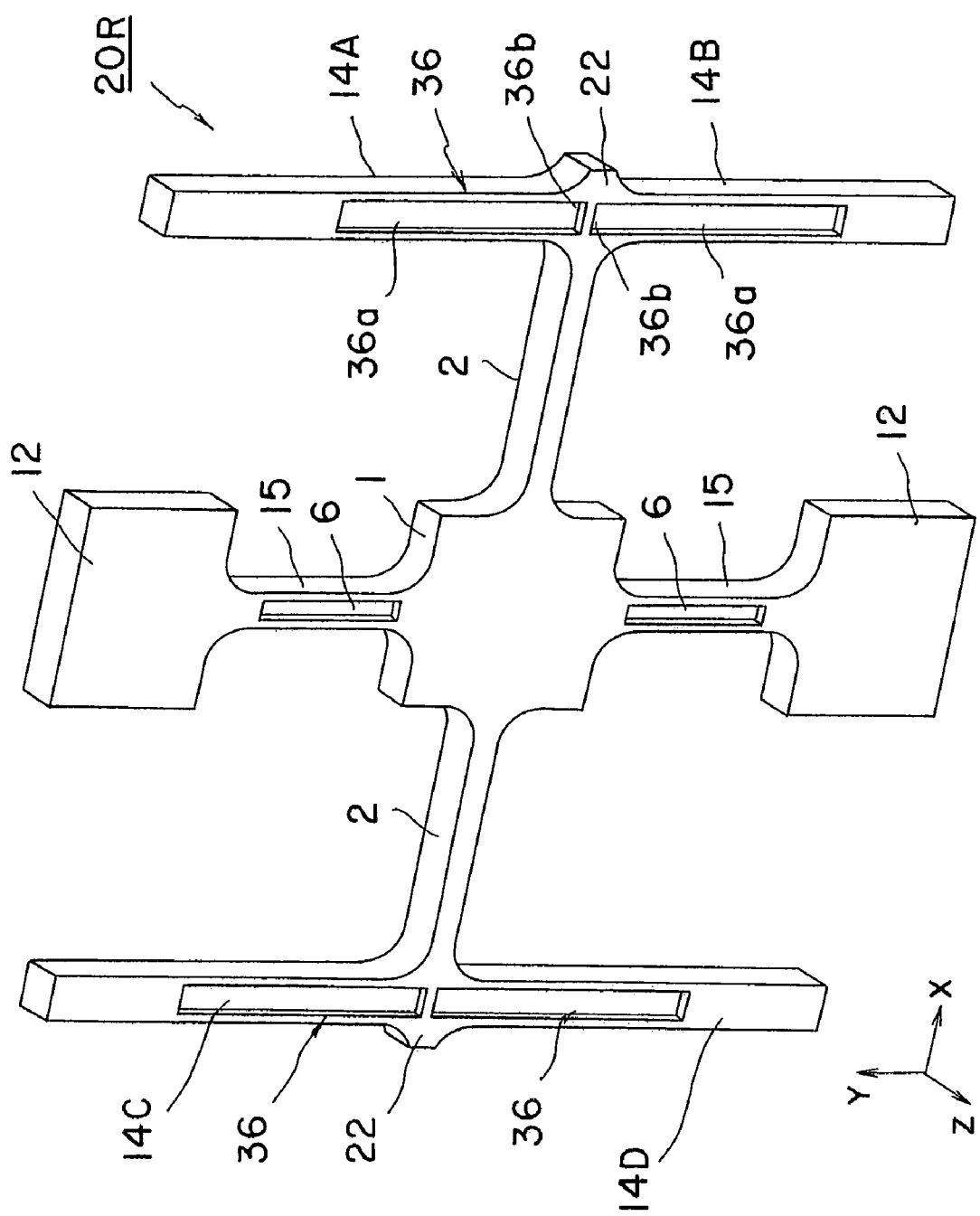
FIG. 21 is a perspective view schematically showing a vibrator 20R according to a fourth aspect of the present invention.

FIG. 21 is a perspective view schematically showing a vibrator 20R according to the fourth aspect of the present invention. The vibrator 20R has first bending vibration arms 14A, 14C, second bending vibration arms 14B, 14D and base portions 22. The first bending vibration arms 14A, 14C and second bending vibration arms 14B, 14D extend substantially along linear lines, respectively. Grooves 36 are continuously formed in the arms 14A, 14C and base portion 22 on the one main face 33 and the other main face 34, respectively. The grooves 36 are also continuously formed in the arms 14B, 14D and base portion 22 on the one main face 33 and the other main face 34, respectively. Each groove 36 includes a groove part 36a in each of the arms 14A, 14B, 14C and 14D, and a groove part 36b in the base portion 22. The groove parts 36a and 36b communicate with each other.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical quantity can be detected through a detection circuit. Such physical quantity may preferably be an acceleration, an angular acceleration or an angular velocity applied on a vibrator. The measuring system of the present invention may preferably be an inertia censor.

In a preferred embodiment, the vibrator is made of a piezoelectric material and preferably a piezoelectric single crystal. The piezoelectric single crystal may more preferably be selected from the group consisting of quartz, lithium niobate, lithium tantalite, lithium niobate-lithium tantalite solid solution, lithium borate and langasite. A 130° Y-plate of lithium niobate, lithium tantalite or lithium niobate-lithium tantalite solid solution is most preferred.

EXAMPLES

The vibrators shown in FIGS. 1 to 17 were produced and the sensitivity and an applied voltage when fracture occurs were measured. Specifically, a chromium film of 200 angstroms in thickness and a gold film of 5000 angstroms in thickness were formed on a wafer made of a Z-plate of quartz with a thickness of 0.3 mm by sputtering. Both main faces of the wafer were coated with resist films, respectively.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator 5. Aluminum films each having a thickness of 2000 angstrom were formed as electrode films using a metal mask.

The patterns of the grooves and through holes were formed on the main faces 33 and 34 of each vibrator by wet etching. A supporting hole was formed in the central part of the base portion 1 of each vibrator. A metal pin was inserted through the supporting hole and each vibrator was adhered with the metal pin with a silicone resin adhesive.

The sensitivity and applied voltage when fracture occurs were measured for each vibrator as follows. The results were shown in tables 1 and 2.

Sensitivity

A vibratory gyroscope was attached to a rotatable table. The table was turned and a signal is drawn from the detection electrodes using a lock-in amplifier. The signal was processed to measure the strength of a signal component synchronized with the driving signal. The turning angular rate was separately measured. The signal component was divided by the measured turning angular rate to obtain the sensitivity.

Applied Voltage When Fracture Occurs

The driving signal was applied on the vibratory gyroscope to excite the driving vibration as well as the driving current was monitored by means of an oscilloscope. The driving voltage was started at 1 volt and gradually elevated. As the driving voltage is elevated, the arm is finally broken so that the signals on the oscilloscope disappear. The voltage when the arm is broken is specified as the applied voltage when fracture occurs.

TABLE 1

| Fig | | Sensitivity μA/°/sec | Fracture Voltage (V) | Construction of Examples | t/W (%) |
|---|---|---|---|---|---|
| 1 | Comparative Example | 2.8 | 14.3 | Grooves in driving and detection vibration arms | 0% |
| 2 | Comparative Example | 1.7 | 31.4 | Grooves are not provided in driving and detection vibration arms | None |
| 3 | Example | 5.0 | 9.8 | Weight portions and grooves in Driving and detection vibration arms | 0% |
| 5 | Example | 5.4 | 15.2 | Weight portions and grooves in Driving and detection vibration arms | 50% |
| 6 | Example | 12.0 | 19.6 | Tapered groove and weight portion in driving vibration arm Groove and weight portion in detection vibration arm | 0% |
| 7 | Example | 9.1 | 25.4 | Tapered groove and weight portion in driving vibration arms Groove and weight portion in detection vibration arm | 50% |
| 8 | Example | 10.7 | 17.2 | Weight portions and grooves in driving and detection vibration arms | 50% |
| 9 | Example | 4.9 | 14.2 | Weight portions and grooves In driving and detection Vibration arms Groove in supporting portion 2 | 0% |

TABLE 2

| Fig | Sensitivity μA/°/sec | Fracture Voltage (V) | Construction of Examples | t/W (%) |
|---|---|---|---|---|
| 10 Example | 7.0 | 14.1 | Groove, through hole in groove and weight portion in driving vibration arm<br>Groove in detection vibration arm | 50 |
| 11 Example | 7.5 | 14.2 | Groove, through hole in groove and weight portion in driving vibration arm<br>Groove and weight portion in detection arm | 50 |
| 12 Example | 9.0 | 14.2 | Grooves, through holes in grooves and weight portions in driving and detection vibration arms | 50 |
| 13 Example | 5.9 | 14.3 | Groove continuously formed over two driving arms:<br>Weight portion in driving arm<br>Groove and weight portion in detection arm | — |
| 14 Example | 4.2 | 14.2 | Groove continuously formed over two driving arms:<br>Groove in detection arm | — |
| 15 Example | 4.6 | 14.1 | Groove continuously formed over two driving Arms:<br>Groove and weight portion in detection arm | — |
| 16 Example | 7.5 | 14.3 | Groove continuously formed over two driving Arms:<br>Weight portion and through hole in driving arm<br>Groove and weight portion in detection arm | — |
| 17 Example | 7.9 | 14.2 | Groove continuously formed over two driving Arms:<br>Weight portion and through hole in driving arm<br>Groove continuously formed over two detection arms:<br>Weight portion in detection arm | — |

The vibrators shown in FIGS. 1 and 2 proved to have lower sensitivities. The vibrators shown in FIGS. 3 to 17 exhibited higher sensitivities. The applied voltage when fracture occurs can be considerably improved, particularly by providing planar tapered portions in the grooves (FIGS. 6 and 7).

As described above, according to the present invention, the sensitivity of a vibrator can be improved, having at least one bending vibration arm vibrating along a specified plane in bending mode and a base portion provided at one end of the arm.

The present invention has been explained referring to the preferred embodiments, however, the present invention is not limited to the illustrated embodiments which are given by way of examples only, and may be carried out in various modes without departing from the scope of the invention.

The invention claimed is:

1. A vibrator comprising:
at least one bending vibration arm vibrating in bending mode along a specified plane, said bending vibration arm having first and second ends and first and second main faces that are substantially parallel with each other;
a base portion provided at one of said first and said second ends of said bending vibration arm;
a groove formed on each said first and second main faces; and
a through hole formed between said first main face and said second main face and in communication with said grooves.

2. The vibrator of claim 1, wherein said grooves comprises a tapered portion having a reduced width proximate said base portion.

3. The vibrator of claim 1, wherein said through hole is in communication with each said groove at a first end of said grooves.

4. The vibrator of claim 3, further comprising a plurality of said through holes, wherein one of said plurality of through holes is in communication with said first end of each said groove and another of said through holes is in communication with a second end of each said groove.

5. The vibrator of claim 1, wherein said bending vibration arm further comprises a weight portion at a tip of the other one of said first and said second ends of said bending vibration arm.

6. A device for generating a signal for measuring a physical quantity using a vibrator, said device comprising:
the vibrator of claim 1;
driving means for exciting a driving vibration in said vibrator; and
detecting means for detecting an output signal based on a detection vibration induced in said vibrator responsive to said physical quantity.

7. A vibrator comprising:
a first bending vibration arm vibrating in a bending mode along a specified plane;
a second bending vibration arm vibrating in a bending mode along said specified plane;
a base portion provided between said first and said second vibration arms;
a first main face; and
a groove continuously formed in said first bending vibration arm, said second bending vibration arm and said base portion on said first main face.

8. The vibrator of claim 7, wherein said vibrator further comprises a second main face substantially parallel with said first main face, and wherein another groove is continuously formed in said first bending vibration arm, said second bending vibration arm and said base portion on said second main face.

9. The vibrator of claim 8, wherein said first bending vibration arm further comprises a through hole between said first and said second main faces, and wherein said through hole is in communication with said grooves.

10. The vibrator of claim 9, wherein said second bending vibration arm further comprises a through hole between said first and said second main faces, and wherein said through hole is in communication with said grooves.

11. The vibrator of claim 7, wherein said first bending vibration arm comprises a weight portion at a tip end of said first bending vibration arm.

12. The vibrator of claim 11, wherein said second bending vibration arm comprises a weight portion at a tip end of said second bending vibration arm.

13. The vibrator of claim 7, wherein said groove comprises a tapered portion having a reduced width proximate said base portion at least in said first bending vibration arm.

14. The vibrator of claim 11, wherein said groove comprises a tapered portion having a reduced width proximate said base portion at least in said first bending vibration arm.

15. The vibrator of claim 7, wherein said groove comprises a tapered portion having a reduced width proximate said base portion at least in said second bending vibration arm.

16. The vibrator of claim 12, wherein said groove comprises a tapered portion having a reduced width proximate said base portion at least in said second bending vibration arm.

17. A device for generating a signal for measuring a physical quantity using a vibrator, said device comprising:
the vibrator of claim 7:
driving means for exciting a driving vibration in said vibrator; and
detecting means for detecting an output signal based on a detection vibration induced in said vibrator responsive to said physical quantity.

18. A vibrator comprising:
a first bending vibration arm vibrating in bending mode along a specified plane;
a second bending vibration arm vibrating in bending mode along said specified plane;
a base portion provided between said first and said second bending vibration arms;
a first main face; and
a groove continuously formed in said first bending vibration arm and said base portion on said first main face;
wherein said first and said second bending vibration arms are formed along a substantially straight line.

19. The vibrator comprising:
a first bending vibration arm vibrating in a bending mode along a specified plane;
a second bending vibration arm vibrating in a bending mode along said specified plane;
a base portion provided between said first and said second bending vibration arms;
a first main face;
a first groove continuously formed in said first bending vibration arm and said base portion on said first main face; and
a second groove continuously formed in said second bending vibration arm and said base portion on said first main face;
wherein said first and said second bending vibration arms are formed along a substantially straight line.

20. The vibrator of claim 18, wherein said groove comprises a tapered portion having a reduced width proximate said base portion at least in said first bending vibration arm.

21. The vibrator of claim 19, wherein said second groove comprises a tapered portion having a reduced width proximate said base portion at least in said second bending vibration arm.

22. A device for generating a signal for measuring a physical quantity using a vibrator, said device comprising:
the vibrator of claim 18;
driving means for exciting a driving vibration in said vibrator; and
detecting means for detecting an output signal based on a detection vibration induced in said vibrator responsive to said physical quantity.

23. The vibrator of claim 19, wherein said first groove comprises a tapered portion having a reduced width proximate said base portion at least in said first bending arm.

* * * * *